United States Patent [19]

Bradbury

[11] Patent Number: 5,597,169
[45] Date of Patent: Jan. 28, 1997

[54] SUSPENSION FORK FOR BICYCLES

[75] Inventor: E. Douglas Bradbury, Colorado Springs, Colo.

[73] Assignee: Manitou Maountain Bikes, Inc., Colorado Springs, Colo.

[21] Appl. No.: 483,451

[22] Filed: Jun. 6, 1995

Related U.S. Application Data

[63] Continuation of Ser. No. 241,050, May 10, 1994, Pat. No. 5,445,401, which is a continuation-in-part of Ser. No. 116,683, Sep. 7, 1993, Pat. No. 5,470,090.

[51] Int. Cl.[6] .................................................. B62K 25/08
[52] U.S. Cl. ........................................ 280/276; 267/141.1
[58] Field of Search ................................ 280/276, 275, 280/277, 279, 281.1, 283, 284, 285, 286, 288; 267/141.1, 141, 141.3, 170

[56] References Cited

U.S. PATENT DOCUMENTS

| | | | |
|---|---|---|---|
| 2,477,748 | 8/1949 | Hutchins | 280/277 |
| 2,683,034 | 7/1954 | Seddon | 267/63 |
| 2,683,044 | 7/1954 | Seddon et al. | 280/276 |
| 2,708,112 | 5/1955 | Seddon et al. | 267/63 |
| 3,083,038 | 3/1963 | Moulton | 280/276 |
| 4,421,337 | 12/1983 | Pratt | 280/277 |
| 4,561,669 | 12/1985 | Simons | 280/276 |
| 4,971,344 | 11/1990 | Turner | 280/276 |
| 5,060,961 | 10/1991 | Bontrager | 280/279 |
| 5,088,705 | 2/1992 | Tsai | 267/226 |
| 5,098,120 | 3/1992 | Hayashi et al. | 280/710 |
| 5,186,481 | 2/1993 | Turner | 280/276 |
| 5,193,832 | 3/1993 | Wilson et al. | 280/276 |
| 5,193,833 | 3/1993 | Reisinger | 280/276 |
| 5,238,259 | 8/1993 | Wilson et al. | 280/276 |
| 5,269,549 | 12/1993 | Wilson et al. | 280/276 |
| 5,284,352 | 2/1994 | Chen | 280/276 |
| 5,301,973 | 4/1994 | Truchinski | 280/276 |
| 5,310,203 | 5/1994 | Chen | 280/276 |
| 5,367,918 | 11/1994 | Chang et al. | 280/279 X |
| 5,417,446 | 5/1995 | Pileggi | 267/219 X |
| 5,441,291 | 8/1995 | Girvin, III | 280/276 |
| 5,449,189 | 9/1995 | Chen | 280/276 |
| 5,460,357 | 10/1995 | Stewart | 267/141.1 X |

Primary Examiner—Kevin Hurley
Attorney, Agent, or Firm—Sheridan Ross P.C.

[57] ABSTRACT

A bicycle fork for interconnecting a bicycle wheel to a bicycle frame. The bicycle fork includes first and second leg members slidably engaged with each other, an elastomer spring for providing a biasing force when the leg members are compressed toward each other, and a damping mechanism for providing a damping force to resist relative movement of the leg members. The damping mechanism provides expansive damping greater than compressive damping and further allows for adjustment of the expansive damping to fine tune the suspension characteristics of the bicycle fork.

18 Claims, 15 Drawing Sheets

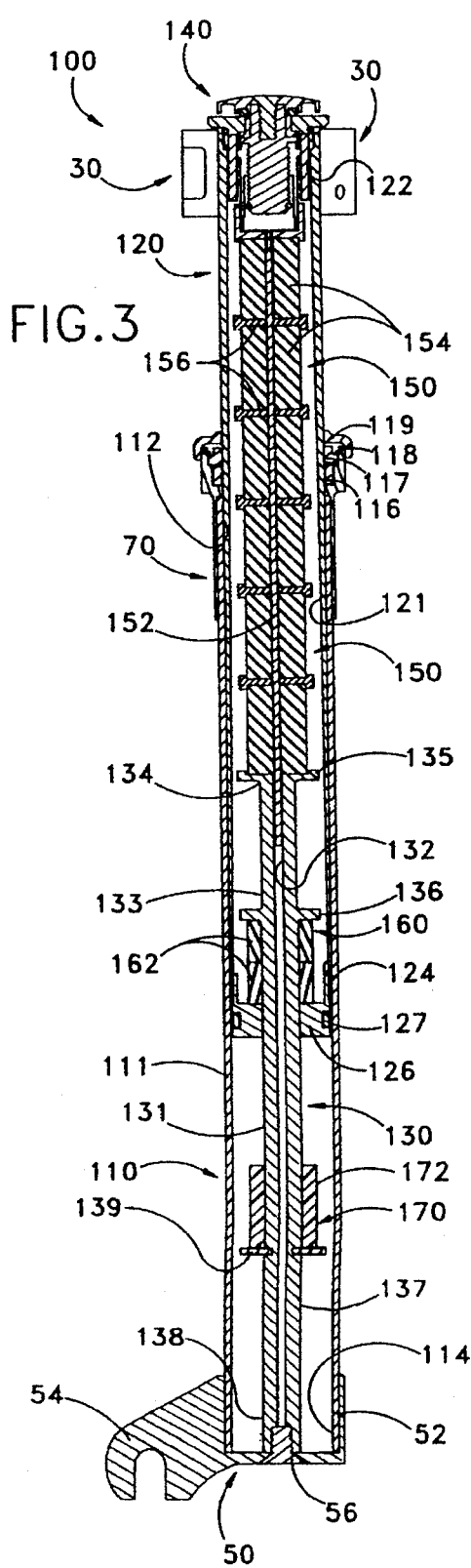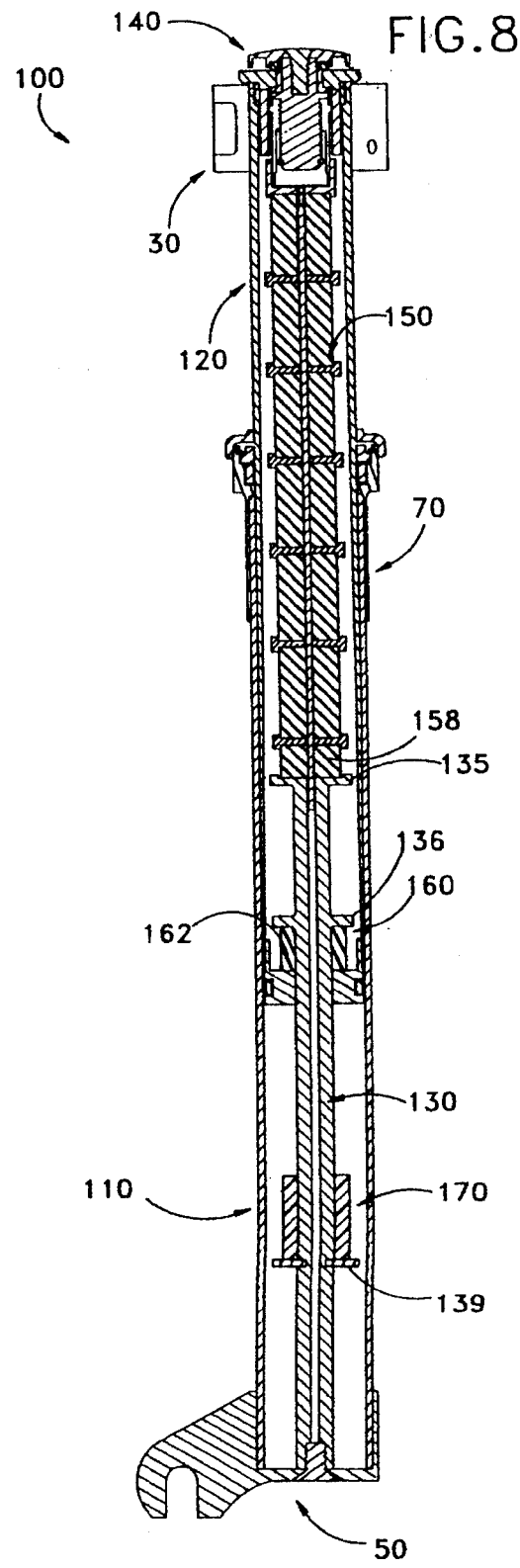

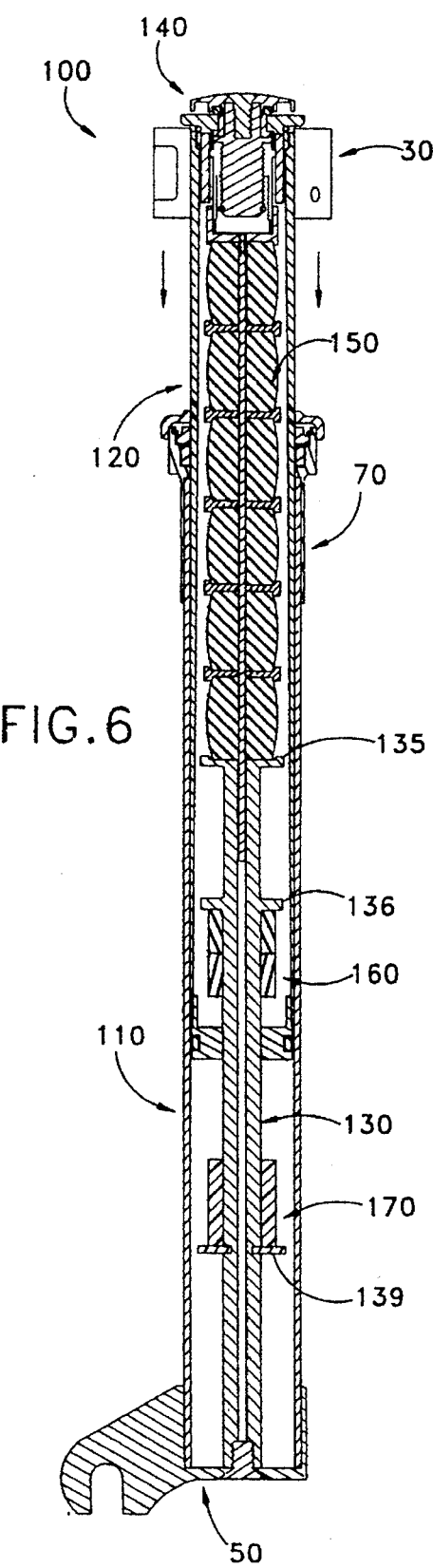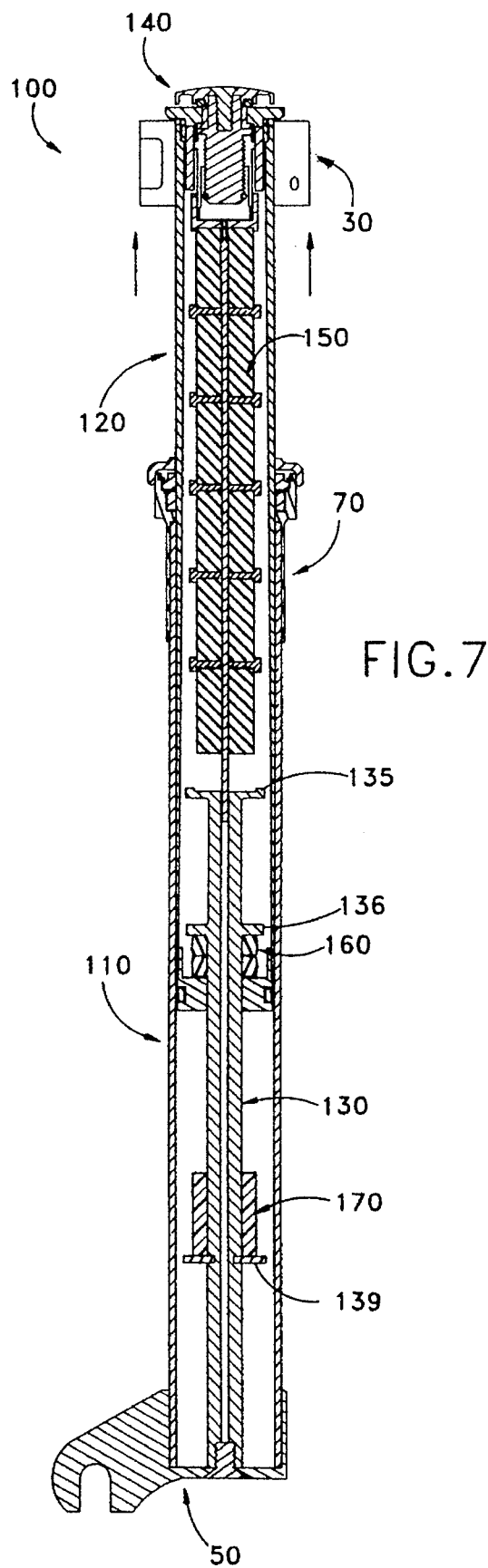

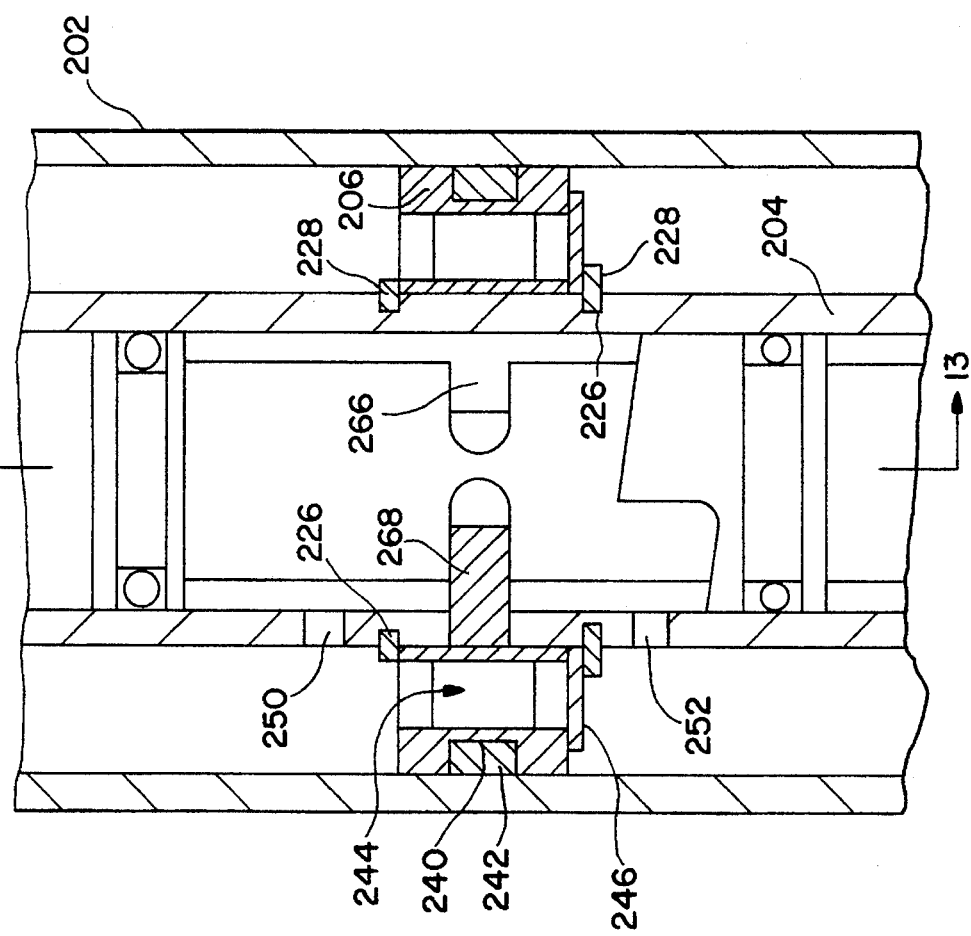

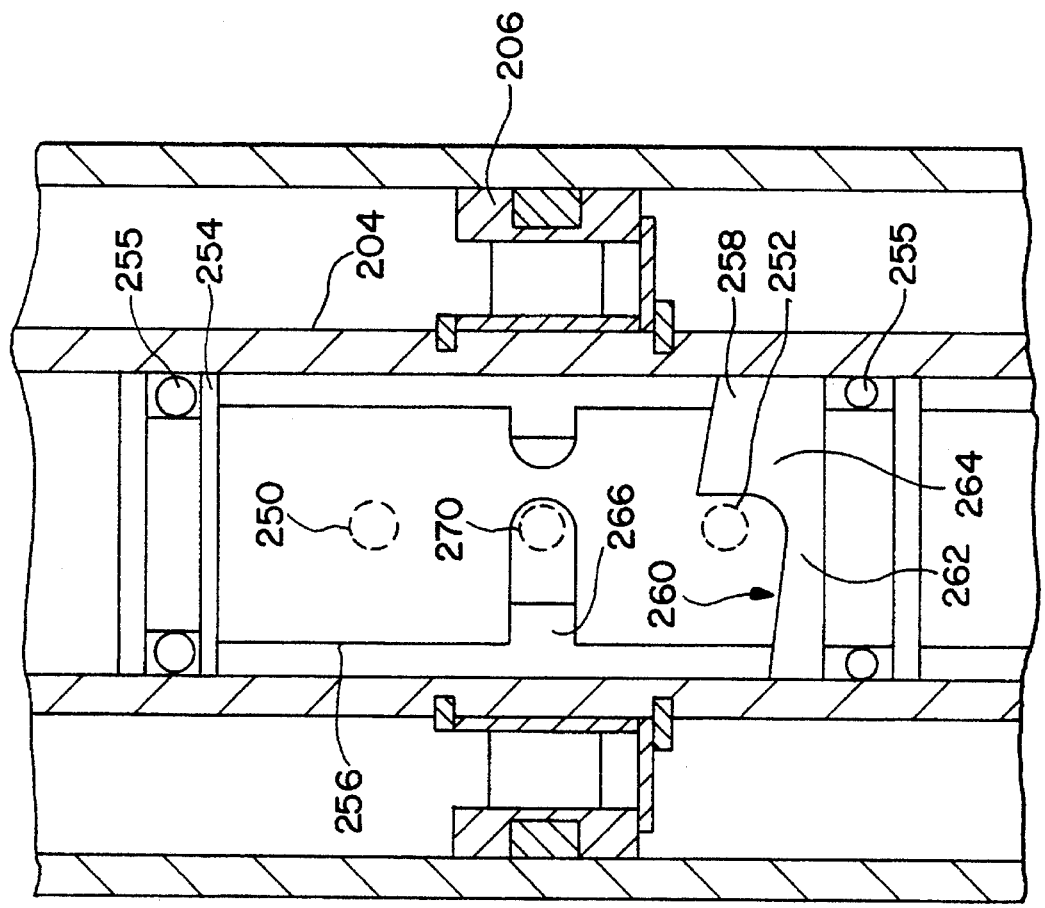

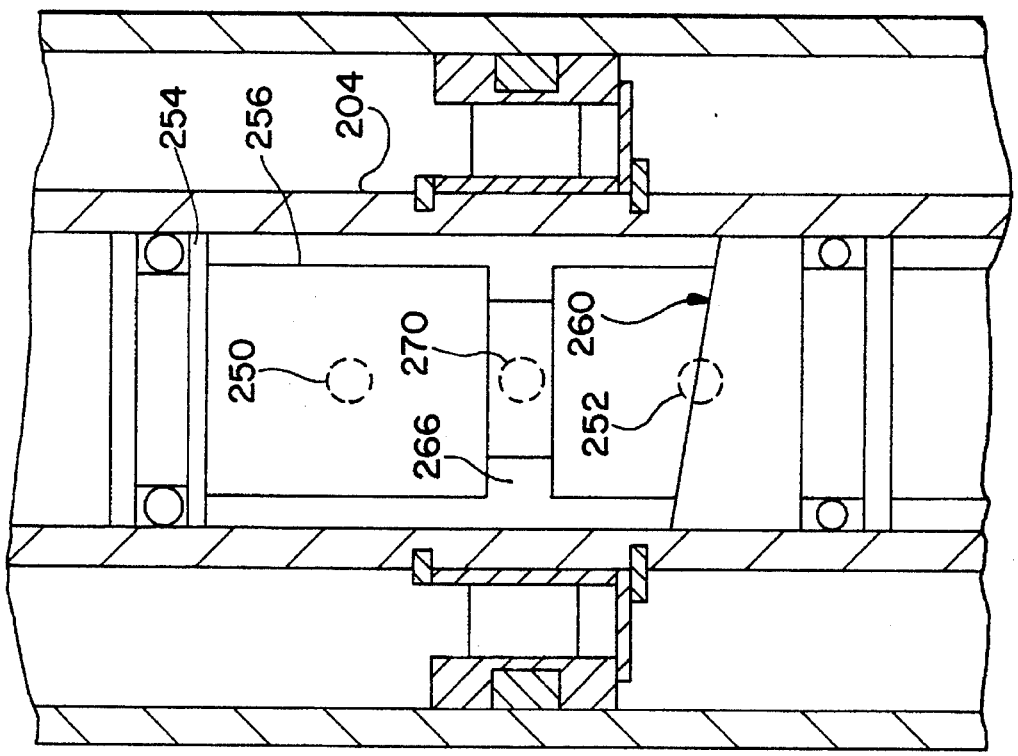

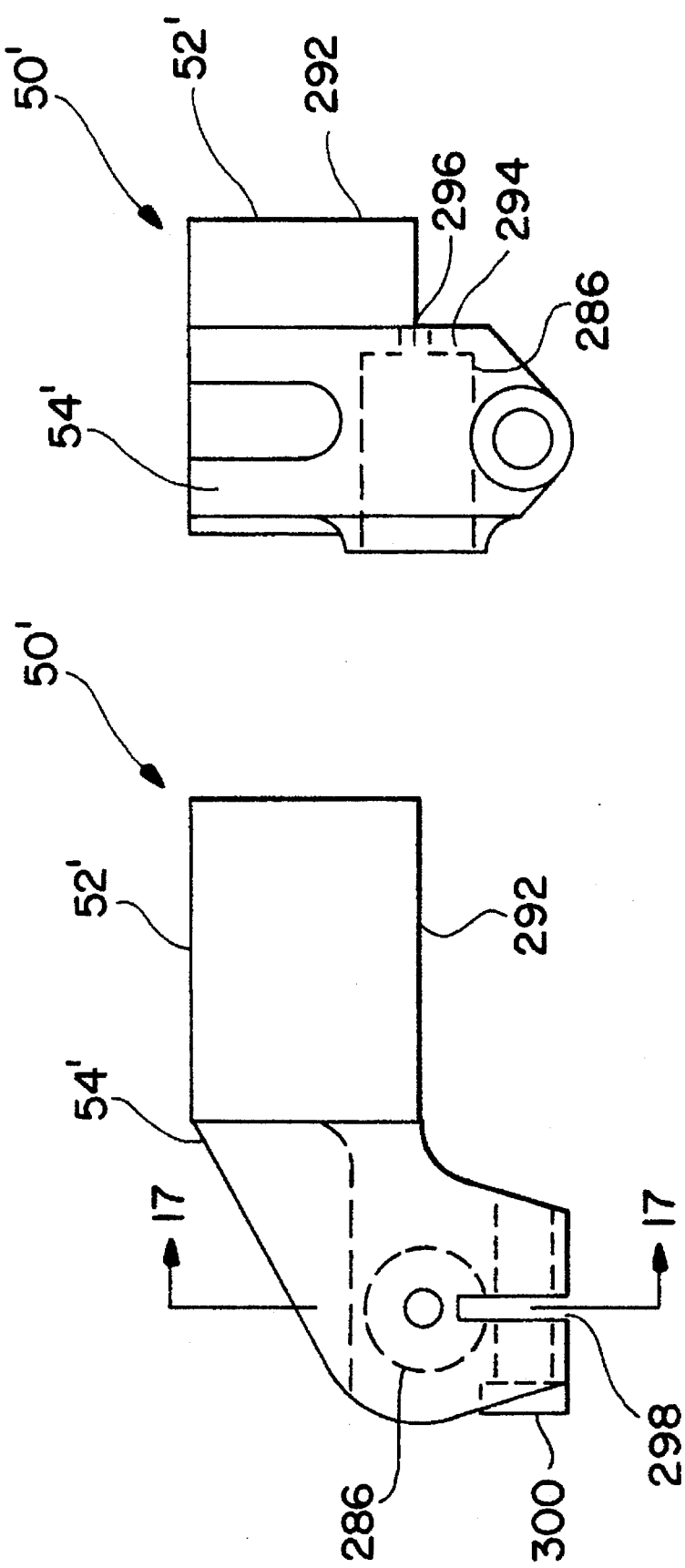

SUSPENSION FORK FOR BICYCLES

This is a continuation of application Ser. No. 08/241,050, filed May 10, 1994, US. Pat. No. 5,445,401, which is a continuation in part of Ser. No. 116,683, filed Sep. 7, 1993, now U.S. Pat. No. 5,470,090.

FIELD OF INVENTION

The present invention generally relates to the field of bicycles and, more particularly, to bicycles having suspension fork assemblies which allow the fork to absorb and damp load variations experienced by the wheels of the bicycle caused, for instance, by uneven terrain.

BACKGROUND OF THE INVENTION

Bicycle forks provide a means whereby the front wheel of a bicycle may be rotated relative to the bicycle frame and to allow for steering and control of the bicycle. Bicycle forks typically include a fork crown interconnected with a fork steerer tube rotatably mounted via bearings within a head tube of the bicycle frame. Two fork blades extend downwardly from opposing ends of the fork crown to provide securement of the crown to opposing sides of the axle of a front bicycle wheel. Rotation of the fork for steering is accomplished by rotating handlebars secured to the upper portion of the fork steerer tube.

Recently, bicycle forks have been designed which allow for absorption of load variations experienced by the front wheel of the bicycle caused by, for example, riding the bicycle over uneven terrain. One way of accomplishing such absorption is to provide fork blades which will shorten in length in response to application of an upward force on the bicycle wheel to which it is secured. For example, forks have been designed wherein each fork blade comprises inner and outer telescoping members compressible toward each other and expandable away from each other. Such forks typically include a means for biasing the telescoping members away from each other, such as by the use of coil springs, elastomers, and air springs. As uneven terrain and associated load variations are encountered by the front wheel, the telescoping members compress toward each other and the biasing means provides an increasing counteracting force to absorb the change in load and thereby at least partially prevent transfer thereof to the handlebars of the bicycle.

As noted above, elastomer members have been utilized to provide shock absorption for bicycle forks. For example, copending and commonly assigned U.S. patent application Ser. No. 08/116,683, filed Sep. 7, 1993, entitled "PRECISION SUSPENSION FORK FOR BICYCLES", and incorporated herein by reference, discloses a bicycle fork utilizing a plurality of elastomer members which are compressed upon compression of the telescoping members toward each other.

Under certain riding conditions such as while encountering extremely rough terrain, bicycle forks utilizing elastomers may rebound (i.e., expand) too rapidly after application and removal of a force to the fork (e.g., after hitting a large bump). Such sudden expansion of the telescoping members can result in an undesirable "clunking" noise and may further adversely affect the structural integrity of the fork over a long period of time. Such sudden expansion may also adversely affect the handling characteristics of the bicycle.

Accordingly, it is an object of the present invention to provide an elastomer-based suspension system for a bicycle fork, wherein the sudden rebound (i.e., expansion) of the telescoping members upon application and removal of a sudden force to the fork is damped. It is a related object of the present invention to provide rebound damping to an elastomer-based bicycle fork, wherein the rebound damping is adjustable. It is yet another related object of the present invention to provide such a bicycle fork having both rebound and compression damping with the amount of the rebound damping being greater than the amount of compression damping.

SUMMARY OF THE INVENTION

The present invention relates to an elastomer-based bicycle fork having a damping mechanism for controlling the expansion rate of the fork, which may also provide adjustable expansive damping, and which may also provide both compressive and expansive damping, with the amount of expansive damping being greater than the compressive damping. The bicycle fork generally includes at least one leg assembly having first and second leg members slidably engaged with each other to allow compression of the leg assembly by relative movement of the first and second members toward each other, and expansion of the associated leg assembly by relative movement of the first and second leg members away from each other. The bicycle fork further includes biasing means, e.g., including at least one elastomer, for providing a biasing force when the leg assembly is compressed (i.e., by relative movement of the leg members toward each other). In accordance with the present invention, the bicycle fork further includes damping means for providing a damping force to resist relative movement between the first and second leg members.

In one aspect, the damping means comprises means for providing compressive damping when the leg assembly is compressed and means for providing expansive damping when the leg assembly is expanded, with the amount of expansive damping being greater than that of the compressive damping. The provision of expansive damping greater than compressive damping provides desirable rebound damping without significantly adversely affecting the shock-absorbing characteristics of the fork. Preferably, a means for providing compressive damping and means for providing expansive damping comprise a damper cylinder interconnected with one of the leg members and containing a damping fluid therein, and a damper piston slidably positioned within the damper cylinder and interconnected with the other of the leg members. The damper piston may include valve means for restricting flow of fluid through the damper piston, such that relative movement of the leg members causes relative movement of the damper cylinder and damper piston to thereby cause fluid to flow through the valve means.

The valve means may include a first valve for allowing flow of fluid through the damper piston during compression of the leg assembly, and a second valve for allowing flow of fluid through the damper piston during expansion of the leg assembly. In one embodiment, the first valve comprises a plurality of first ports extending through the damper piston. Preferably, the first valve is a one-way valve that substantially prevents flow of fluid through the first valve during expansion of the leg assembly, but allows for such flow during compression. For example, the first valve may include a flexible washer positioned adjacent to the ports which form the first valve.

In one embodiment, the second valve includes at least one second port and a closure member selectively movable to vary an effective cross-sectional area of the second port, thereby providing selectively adjustable expansive damping. The second valve is preferably a two-way valve such that, during compression of the leg assembly, fluid may flow through both the first and second valves under relatively low resistance, while during expansion of the leg assembly, fluid is only allowed to flow through the second valve which acts to restrict flow of fluid therethrough and provide desirable damping characteristics to the bicycle fork. Preferably, the closure member is at least partially exposed to an exterior of the fork to allow for selective movement of the closure member without disassembly of the fork. In one embodiment, the closure member is rotatable relative to the second port and may advantageously include a helical surface which variably blocks the port when the closure member is rotated relative to the second port.

In one embodiment, the noted first leg member slides within the second leg member, the damper piston is interconnected with the second leg member, and the damper cylinder is interconnected with the first leg member. In this embodiment, the bicycle fork may further comprise a damper shaft secured to the second leg member and slidably extending through the damper cylinder toward the first leg member to engage a lower portion of the biasing means. Preferably, the damper piston is interconnected with the damper shaft, and the closure member is positioned within a hollow interior of the damper shaft.

In order to avoid inadvertent movement of the closure member relative to the second port, the bicycle fork may further include an indexing means for indexing movement of the closure member relative to the second port. For example, the indexing means may comprise a splined surface and an indexing member movably positioned adjacent to and in contact with the splined surface, such that movement of the closure member relative to the second port causes the indexing member to slide along the splined surface. Biasing means may further be provided for biasing the indexing member into contact with the splined surface. For example, this biasing means may include an elastomer which also functions as a second stage elastomer to further cushion forces applied during hypercompression of the first and second leg members.

The present invention is further directed to a dropout configuration for securing the fork to a wheel axle. The dropout generally includes a plug portion for securing the dropout to the lower end of the leg assembly and an axle engaging portion cantilevered off the front side of the plug portion. The axle engaging portion includes an aperture for insertably receiving a wheel axle. For example, the aperture may be substantially cylindrical in shape for receiving a tubular axle. The aperture includes an engaging surface which engages the wheel axle more than halfway around the perimeter of the axle. For example, when a tubular axle and cylindrical aperture are utilized, the engaging surface engages the wheel axle more than 180° around the circumference of the axle. Accordingly, the axle must be inserted into the dropout from the end of the aperture, rather than through an opening in the side of the aperture as is common in the art. The dropout may further include means for clamping the dropout to the wheel axle. For example, a slot may be provided through at least a portion of the aperture such that the dropout may be tightened around the perimeter of the wheel axle utilizing, for example, clamping bolts. By virtue of the novel dropout configuration, the axle-receiving aperture wraps more than halfway around the wheel axle and thereby provides a stronger dropout-to-axle interface, resulting in improved riding characteristics.

BRIEF DESCRIPTION OF THE DRAWINGS

FIG. 3 is a cross-sectional view, taken along line 3—3 in FIG. 1, of a telescoping leg assembly in its balanced, short travel condition.

FIG. 6 is a cross-sectional view of the telescoping leg assembly in its compressed condition.

FIG. 7 is a cross-sectional view of the telescoping leg assembly in its rebound condition.

FIG. 8 is a cross-sectional view of the telescoping leg assembly converted into its long travel condition.

FIGS. 11a–b are enlarged cross-sectional views illustrating the one-way-valve of the damped fork.

FIGS. 13a–b are cross-sectional views, taken along line 13—13 in FIG. 11a, illustrating the adjustable valve of the damped fork.

FIG. 15 is a side view of an alternative dropout configuration.

FIG. 16 is a front view of an alternative left dropout configuration.

DESCRIPTION OF THE PREFERRED EMBODIMENT

Figure 1:
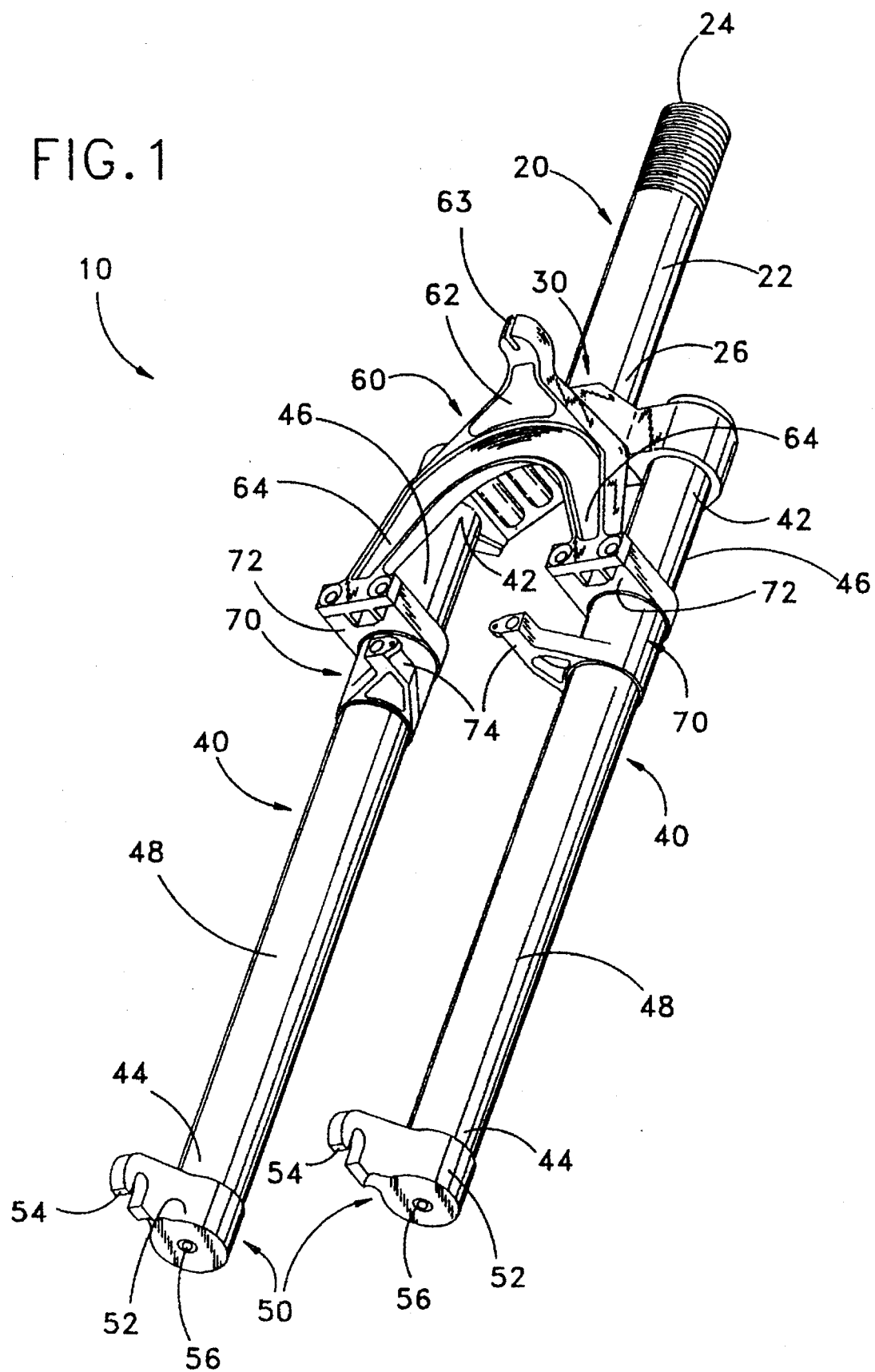
FIG. 1 is a perspective view of a bicycle fork embodying the present invention.

Referring to FIG. 1, there is shown a suspension bicycle fork 10. The fork 10 is to be mounted between a frame part, typically the handlebars, and a wheel axle, typically a front wheel axle, of a bicycle. The main components of fork 10 include a steerer tube 20, a crown 30, two parallel fork legs 40, two dropouts 50, a brake arch 60 and two brake flanges 70. The steerer tube 20 has a short tubular body 22 which has an upper end 24 and a lower end 26. The upper end 24 is threaded to facilitate securement to an upper bearing assembly (not shown), and the upper end 24 is dimensioned to be connectable to the handlebars (not shown) of the bicycle as is known in the art. The lower end 26 is press fit into the crown 30 and is dimensioned to be connectable to a lower bearing assembly (not shown) as is known in the art. Each fork leg 40 has an upper end 42 and a lower end 44. Each fork leg 40 further has a telescoping structure with an upper leg 46 and a lower leg 48 slidably engaged with each other. The upper ends 42 of the fork legs 40 are connected to the crown 30. Each dropout 50 is an integral piece having a plug portion 52 and a wheel axle catch portion 54. The plug portion 52 is press fit to a respective one of the lower ends 44 of the fork legs, and the wheel axle catch portion 54 is attached to a respective end of the wheel axle (not shown).

The illustrated fork 10 further includes a brake arch 60 and a brake flange 70. The brake arch 60 is an integral piece having a cross portion 62 with a rim brake cable receiver 63, and two leg portions 64. The brake flange 70 is also an integral short tubular piece having a brake arch receiver 72 at one end for mounting the brake arch 60, and a rim brake post receiver 74 at the other end for mounting a brake post (not shown in FIG. 1). It is noted that the brake post receiver 74 is spaced apart from the brake arch receiver 72 with a substantial distance therebetween, typically about one and a half inches (1.5 inches).

The illustrated design of the brake arch 60 and brake flange 70 has the following advantages. First, it distributes the stresses exerted on the fork legs 40 to separate locations. The bending stress between the upper leg 46 and the lower leg 48, and the twisting stress from the other fork leg 40 transmitted through the brake arch 60, are distributed to the location of the brake arch receiver 72 of the brake flange. Meanwhile, the braking force transmitted from the brake posts is distributed to a separate location where the brake post receiver 74 is located. Second, since the rib brake posts are now carried by the brake flanges 70, not the brake arch 60, the length of the legs 64 of the brake arch 60 are reduced because they do not need to be as long since they can reach the location where the brake posts are carried. This shorter leg feature increases the strength of the brake arch 60 and its ability to prevent the twisting of the two parallel fork legs 40.

Figure 2:
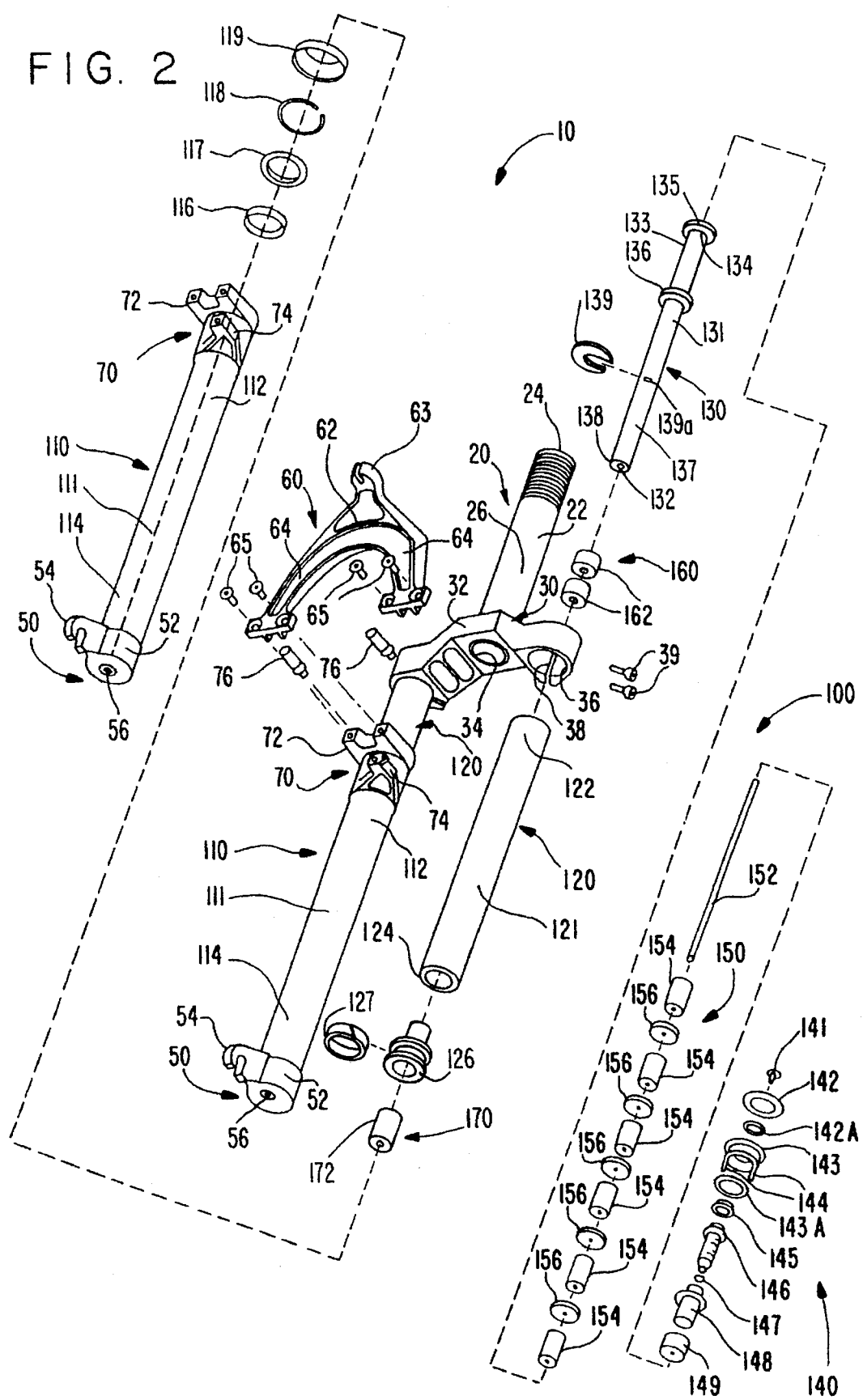
FIG. 2 is a partial exploded perspective view of the bicycle fork illustrated in FIG. 1.

Referring to FIG. 2, there is shown a partial exploded perspective view of the precision suspension fork 10. There is shown that the crown 30 has a body 32 with a central bore 34 and two opposite end bores 36 having slots 38. The lower end 26 of steerer 20 is press fit into central bore 34 of crown 30. This press fit attachment requires no intersecting slot at the center of the crown 30, and therefore avoids any compromise on the strength of the crown 30. There is also shown that the brake arch 60 is mounted to brake arch receiver 72 of brake flange 70 by mounting screws 65. There is further shown rim brake posts 76 are to be mounted to brake post receiver 74 of brake flange 70. A telescoping suspension system 100 is contained in each fork leg 40. Each telescoping suspension system 100 includes an outer tube 110, an inner tube 120, a compression rod 130, an adjuster assembly 140, a compression elastomer assembly 150, a rebound elastomer assembly 160, and a second stage elastomer assembly 170.

Referring to both FIGS. 2 and 3, the outer tube 110 of the illustrated embodiment is the lower leg 48 of the fork leg 40 (as previously shown in FIG. 1). Shown in FIG. 2, the outer tube 110 has an elongated hollow tubular body 111 with an upper end 112 and a lower end 114. The lower end 114 of the outer tube 110 is typically the lower end 44 of the fork leg 40. The upper end 112 is press fit with the brake flange 70, and the lower end 114 is press fit with the plug portion 52 of the dropout 50. The brake flange 70 also houses an upper bushing 116. A dust seal 117 is placed over the upper bushing 116 and retained in position by a retaining ring 118. A dust cover 119 finally covers the bushing assembly.

The inner tube 120 of the described embodiment is the upper leg 46 of the fork leg 40 (as previously shown in FIG. 1). Referring specifically to FIG. 2, inner tube 120 has an elongated hollow tubular body 121 with an upper end 122 and a lower end 124. The upper end 122 of the inner tube 120 is typically the upper end 42 of the fork leg 40 and is clamped into end bore 36 by the action of screws 39 acting to close the slot 38. The outer diameter of the inner tube 120 fits the inner diameter of the outer tube 110, so that the inner tube can be slidably engaged with the outer tube 110. An end plug 126 is press fit to the lower end 124 of the inner tube 120, and houses a lower bushing 127. The end plug 126 has an aperture for allowing the compression rod 130 to slide therethrough.

The sidewall of the inner tube 120 has a reduced thickness and is tapered from the upper end 122 toward the lower end 124. That is, the sidewall of the inner tube is thicker towards its upper end 122 and thinner towards its lower end 124. This feature reduces the weight of the inner tube 120, and thereby the overall weight of the fork tube 10, without sacrificing the strength at upper leg 46 of fork leg 40. It ensures that the fork leg 40 has adequate strength at its upper leg 46 where the most heavy stresses occur.

The compression rod 130 has an elongated body 131 with an internal bore 132. The outer diameter of the compression rod 130 is smaller that the inner diameter of the inner tube 120. The compression rod 130 has an upper portion 133 with an upper end 134. An integral compression flange 135 is positioned at the upper end 134, and an integral rebound flange 136 is positioned at the upper portion 133 and spaced apart from the upper end 134. The compression rod 130 also has a lower portion 137 with a lower end 138. A positive stop clip 139 is attached at the lower portion 137 and spaced apart from the lower end 138 of the compression rod 130.

The positive stop clip 139 is detachable for allowing the compression rod 130 to be placed through the inner tube 120 from the upper end 122 thereof and have the lower portion 137 of the compression rod 130 extend out from the lower end 124 of the inner tube 120 through the end plug 126 thereof. A clip slot 139a is provided on the lower portion 137 of the compression rod 130 and located spaced apart from the lower end 138 of the compression rod 130. The lower end 138 of the compression rod 130 is affixed to the plug portion 52 of the dropout 50 by a small screw 56. In other words, the lower end 138 of the compression rod 130 is coupled with the lower end 114 of the outer leg 110. The functions of the various parts of the compression rod 130 will be described in more detail below.

Figure 5:
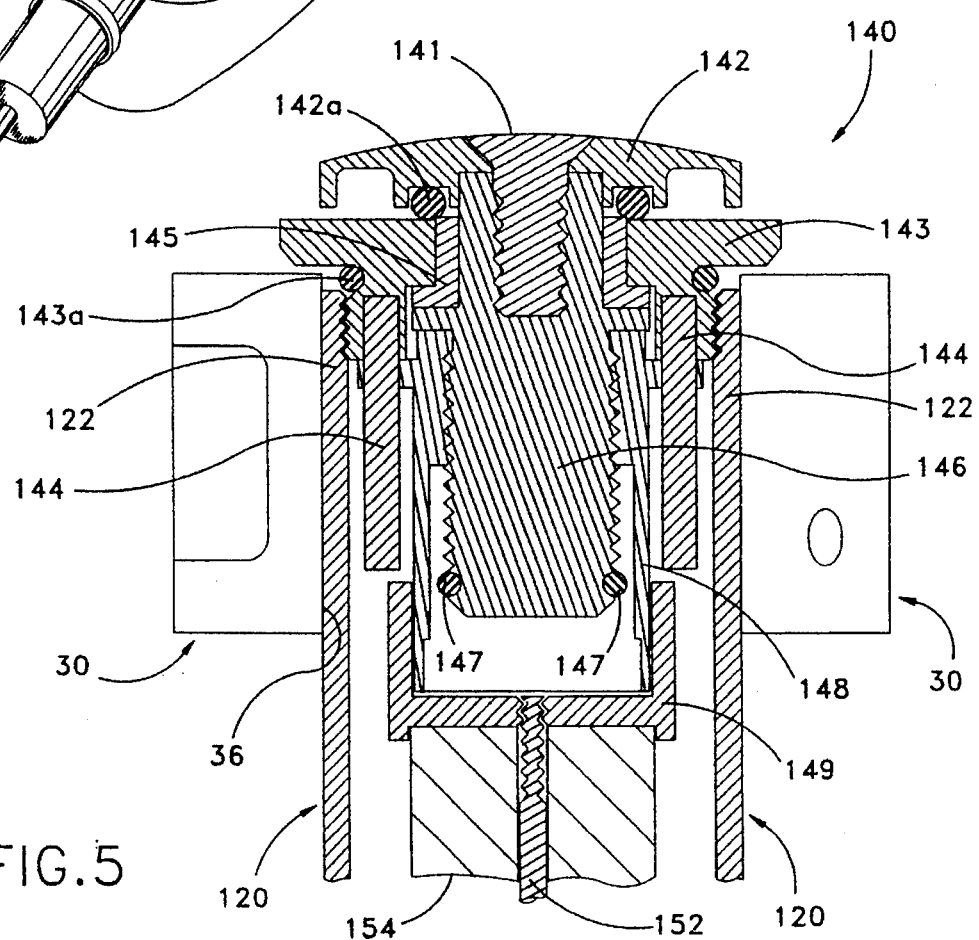
FIG. 5 is an enlarged perspective view of the adjuster assembly of the present invention.

Referring to FIGS. 2 and 5, the adjuster assembly 140 includes a knob screw 141, a knob 142, a knob O-ring 142a, a cap 143, a cap O-ring 143a, a pair of dowel pins 144, a bushing 145, an adjuster screw 146, a retaining ring 147, a spool 148, and an elastomer adapter 149.

The cap 143 is threaded into the upper end 122 of the inner tube 120. The cap 143 can be unthreaded and removed from the upper end 122 of the inner tube 120, and the cap O-ring 143a is provided for easy turning of the cap 143. The two dowel pins 144 are secured to and extend downwardly from the cap 143. The spool 148 is slidably engaged with the cap 143 through the two dowel pins 144. The adjuster screw 146 is threadedly engaged with the spool 148, and is driven by the knob 142 which is coupled to the adjuster screw 146 by the knob screw 141 and is accessible from outside of the upper end 122 of the inner tube 120. The knob O-ring 142a and bushing 145 are provided for easy turning of knob 142 and adjuster screw 146. When the adjuster screw 146 is rotated by turning the knob 142, it drives the spool 148 up or down on the dowel pins 144. The elastomer adapter 149 is press fit with spool 148.

Referring to FIGS. 2–5, the compression elastomer assembly 150 includes an elastomer rod 152, a multiplicity of compression elastomers 154, and a multiplicity of elastomer washers 156. The upper end of the elastomer rod 152 is threadedly attached to the elastomer adapter 149 of the adjuster assembly 140, as shown in FIG. 5. The lower end of the elastomer rod 152 is received by the internal bore 132 of the compression rod 130, as shown in FIG. 3.

The compression elastomers 154 are placed on the elastomer rod 152 in series and partitioned by the elastomer washers 154. Tile elastomer washers 154 may be flat disc-shaped washers. The elastomer washers may also be cup washers each having recesses on both sides for keeping the compression elastomers 154 in place, as shown in FIG. 3. In one of the preferred embodiments, there are six (6) one-inch (1") polyurethane elastomers and five (5) cup washers used for the compression assembly 150.

Figure 4:
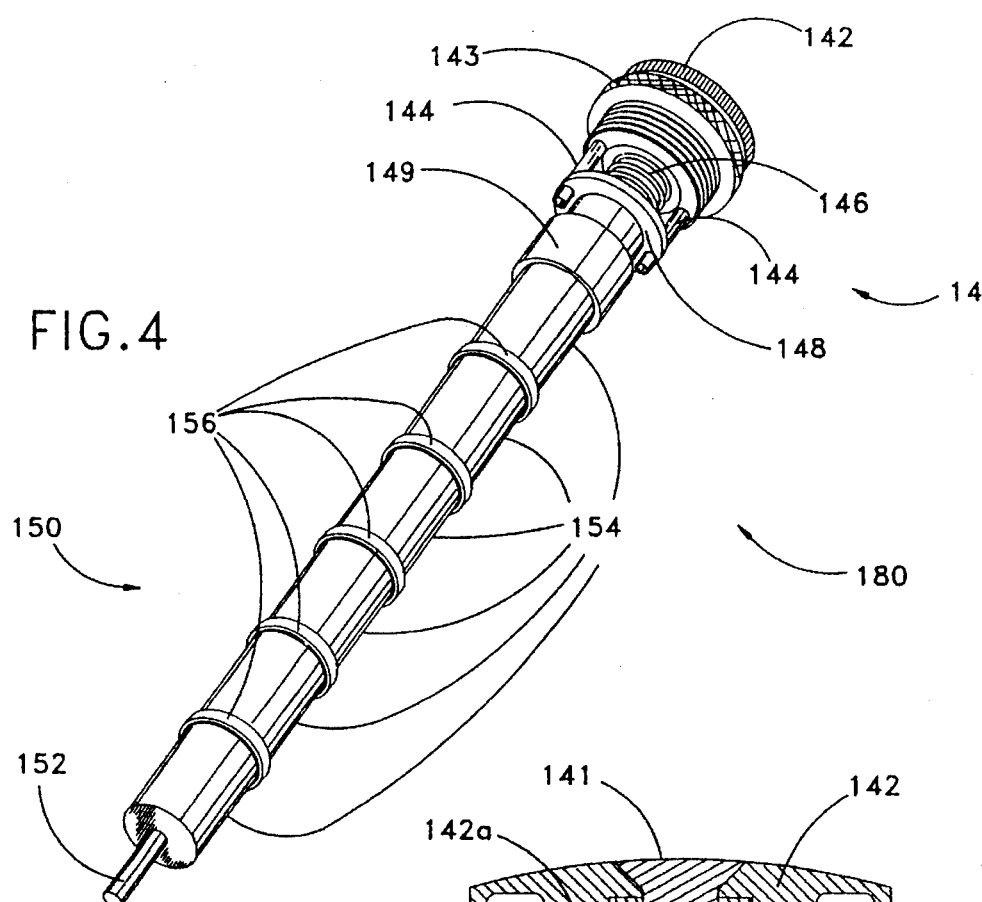
FIG. 4 is an enlarged perspective view of the compression elastomer assembly.

Referring specifically to FIG. 4, when the compression elastomer 152 is attached to the elastomer adapter 149, the adjuster assembly 140 and the compression elastomer assembly 150 are coupled together as a compression piston unit 180. The compression piston unit 180 is accessible at the upper end 122 of the inner tube 120, and can be easily removed therefrom by unscrewing the cap 143 of the adjuster assembly 140. Once removed from the inner tube, a rider of the bicycle can modify the configuration of the compression elastomers, which offers a wide range of adjustment to suit the individual riding preference and weight.

Once assembled, the compression elastomers 154 are positioned inside the inner tube 120 between the elastomer adapter 149 of the adjuster assembly 140 and the compression flange 135 of the compression rod 130. FIG. 3 shows a balanced condition (i.e., under no external load) of the telescoping suspension system 100.

The adjuster assembly 140 provides the ability to fine-tune the preload on the compression elastomers to suit the individual desire or preference of each rider as to the stiffness or firmness of the telescoping suspension system 100. As shown in FIG. 5, this fine-tuning adjustment can be simply made by turning the knob 142 of the adjuster assembly 140, which will drive spool 148 up or down, to adjust the preload applied on the compression elastomers 152 through the elastomer adapter 149. This will modify the initial travel for small bumps, but will not limit the full travel for large bumps. This adjustment can be performed without any tool or any disassembly of the telescoping suspension system.

Referring to FIG. 6, when the telescoping suspension system 100 is compressed from its balanced condition, i.e., when the inner tube 120 slides into the outer tube 110, the compression elastomers 154 are compressed between the elastomer adapter 149 of the adjuster assembly 140 and the compression flange 135 of the compression rod 130, and provide a compressive force to the telescoping suspension system 100.

As noted above, the present invention includes a rebound elastomer assembly 160. As shown in FIGS. 2 and 3 in one of the preferred embodiments of the present invention, the rebound elastomer assembly 160 includes two half-inch (0.5 inch) rebound elastomers 162. The rebound elastomers 162 are placed on the compression rod 130 and positioned inside the inner tube 120, between the rebound flange 136 of the compression rod 130 and the end plug 126 which is affixed at the lower end 124 of the inner tube 120.

As shown in FIG. 7, when the telescoping suspension system 100 rebounds (i.e., expands) from its balanced condition, during which the inner tube 120 slides out from the outer tube 110, the rebound elastomers 162 are compressed between the rebound flange 136 of the compression rod 130 and the lower end 124 of the inner tube 120 (via the end plug 126), and provide a rebound force to the telescoping suspension system 100. Therefore, the present invention telescoping fork provides not only compression force, but also rebound force.

It can be seen that the end plug 126 of the present invention serves two purposes. First, it maintains the concentric alignment of the compression rod 130 with respect to the inner tube 120 and in turn, maintains the concentric alignment of the compression rod 130 with respect to the outer tube 110. Second, it provides an engagement with the rebound elastomers 162 at the lower end 124 of the inner tube 120.

An additional feature of the fork 10 is the design, construction and application of the second stage elastomer assembly 170. As shown in FIGS. 2 and 3, the second stage elastomer assembly 170 includes one positive stop elastomer 172 placed on the compression rod 130. The positive stop elastomer 172 is positioned between the lower end 124 of the inner tube 120 and the positive stop clip 139 of the compression rod. When the bicycle wheel encounters hyper-compression (e.g., caused by a large and sudden bump), it is possible that the inner tube 120 will travel an excessive distance into the outer tube 110. The positive stop clip 139 provides a positive stop to prevent the inner tube 120 from crushing into the outer tube 110 which may result in serious injury to the rider, and the positive stop elastomer 172 provides a secondary compression force to the inner tube 120. In this sense, the compression elastomers 154 can be regarded as the first stage compression elastomers, and the positive stop elastomer 172 can be regarded as the second stage compression elastomer.

A further feature of the fork 10 is the ability to easily convert the fork 10 from a standard travel configuration to a long travel configuration. Referring to FIG. 3, there are six (5) one inch (1 inch) compression elastomers 152. This is the standard travel configuration which gives an approximately two inches (2 inch) standard travel distance of the inner tube 120.

When the rider desires, this standard travel configuration can be easily converted to a long travel configuration by virtue of the design, construction and application of the compression rod 130 and rebound assembly 160. Referring to FIG. 8, which shows the long travel configuration, the conversion can be performed by removing one of the half-inch (0.5 inch) rebound elastomers 162 from the compression rod and placing an additional half-inch (0.5 inch) compression elastomer 158 with an additional washer 159 at the lower end of the elastomer rod 152. With the addition of the new compression elastomer 158, the compression assembly 150 provides an approximately two and a half inch (2.5 inch) long travel distance of the inner tube 120. With the removal of one of the half inch (0.5") rebound elastomers 162, a clearance is provided to allow the lower end 124 of the inner tube 120 to move up.

In addition, a conversion back to the standard travel configuration can be simply performed by removing the additional compression elastomer 158 and putting one rebound elastomer 162 back. Therefore, it can be seen that the fork 10 provides an easy method for converting between the standard travel and long travel configurations.

It is noted that the telescoping suspension system of the fork 10 can be utilized not only for the front fork, but also for the rear fork, of a bicycle. When utilized for the rear fork of the bicycle, each leg of the rear fork has a telescoping suspension system substantially similar as the ones depicted in FIGS. 3 and 6–8.

It is further noted that because of the design and construction of the telescoping suspension system, it does not matter whether the outer or inner tube serves as the upper or lower leg of a bicycle fork. If the outer tube serves as the upper leg and the inner tube the lower leg, the distal end of the outer tube (end 114) will be connected to the crown or bicycle frame, and the distal end of the inner tube (end 122) will be connected to the wheel axle through a dropout.

An important feature of the fork 10 is the design and construction of the compression rod. The compression rod is slidably engaged with the proximal or inner end 124 of the inner tube 120 and has at least one flange on each side of the proximal or inner end 124 of the inner tube 120. The location of the flange located inside the inner tube (flange 135 or 136) makes it possible to have the compression rod engaged with compression elastomers positioned between the flange and the distal or outer end 122 of the inner tube, and also makes it possible to have the compression rod engaged with rebound elastomers positioned between the flange and the proximal or inner end 124 of the inner tube. The location of the flange outside of the inner tube (i.e., clip 139) makes it possible to have the compression rod engaged with second stage compression elastomers positioned between the flange and the proximal or inner end of the inner tube (end 124). Of course it is possible to use only one set of compression elastomers. Furthermore, it is conceivable to use other types of resilient members, such as coil springs, to replace, or in combination with, the compression and rebound elastomers.

Figure 9:
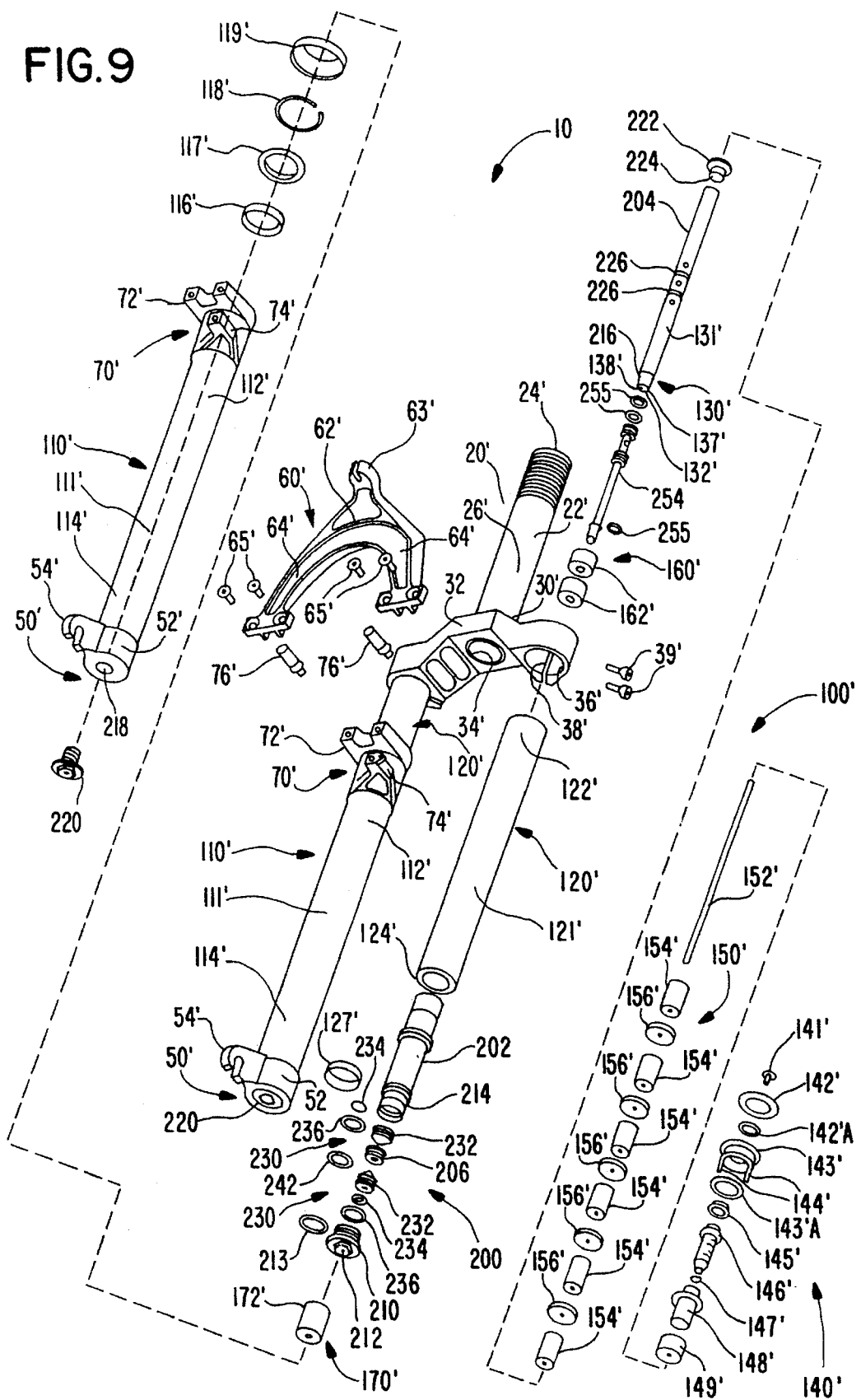
FIG. 9 is a partial exploded prospective view of a bicycle fork embodying the damping aspect of the present invention.

In some circumstances, it may be beneficial to limit, or damp, the rate at which a fork rebounds (i.e., the speed at which the inner and outer tubes move away from each other after application and removal of a compressive force from the fork). Accordingly, a the bicycle fork is provided with a damping mechanism 200 for providing damping forces when the outer tube moves relative to the inner tube. As can be seen in FIG. 9, the damped fork is substantially identical to the undamped fork illustrated in FIGS. 1–8, except for the provision of the damping mechanism 200 and a slight modification to the compression rod, as will be described in more detail below. Parts in FIGS. 9–16, which are substantially identical to parts illustrated in FIGS. 1–8, will be designated by the same number with the addition of a prime (') designation.

The damping mechanism 200 of the fork illustrated in FIGS. 9–13 is designed to provide selective (i.e., adjustable) expansion damping, along with limited compression damping. This is accomplished through the utilization of a piston-cylinder fluid assembly having both one-way and adjustable valves for regulating the flow of fluid through the piston, as described in detail below.

Figure 10:
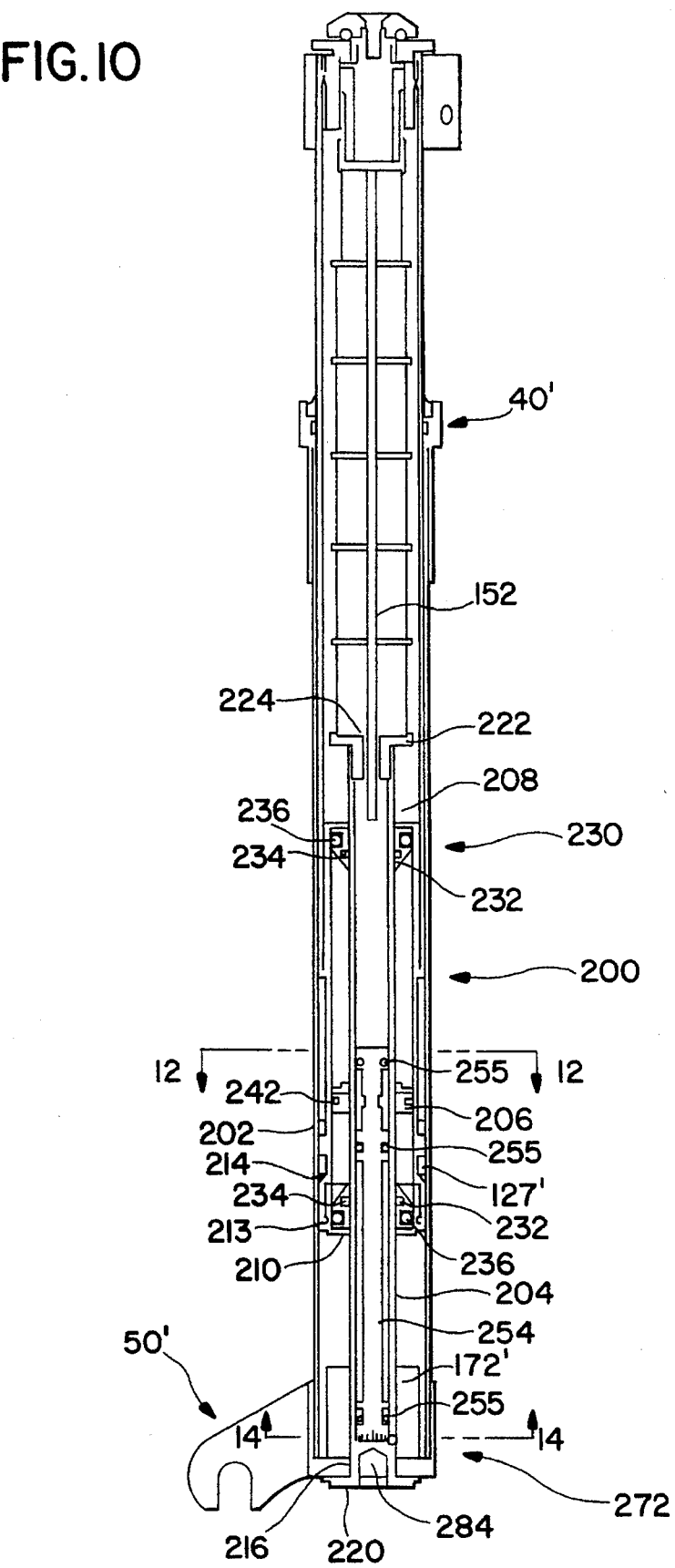
FIG. 10 is a cross-sectional view of a telescoping leg assembly of the damped fork illustrated in FIG. 9.

Referring to FIGS. 9 and 10, the damping mechanism 200 generally includes a damper cylinder 202 adhesively secured into the lower end 124' of the inner tube 120' (i.e., in place of the end plug 126 of the previous embodiment illustrated in FIGS. 1–8) and a damper shaft 204 extending through the damper cylinder 202 and secured on a lower end thereof to the lower end 114' of the outer tube 110' (i.e., in place of the compression rod 130 of the previous embodiment). With such a configuration, it can be appreciated that the damper cylinder 202 will move relative to the damper shaft 204 when the inner tube 120' moves relative to the outer tube 110'. A damper piston 206 is secured to the damper shaft 204 and positioned within the damper cylinder 202 to allow for controlled flow of damper fluid therethrough during movement of the damper cylinder 202 relative to the damper shaft 204. In the described embodiment, the damper fluid comprises 3-weight hydraulic oil.

The damper cylinder 202 generally comprises a longitudinally-extending, cylindrically-shaped member having an upper aperture 208 through the upper end thereof to allow the damper shaft 204 to slide therethrough. A damper end cap 210 is threadedly secured to the lower end of the damper cylinder 202 and includes a lower aperture 212 to allow the damper shaft 204 to slide therethrough. A rubber O-ring 213 is positioned between the damper end cap 210 and the damper cylinder 202 to prevent leakage of damping fluid therebetween. The damper cylinder 202 further includes a circumferential bushing slot 214 in a mid portion thereof for receiving a lower bushing 127' therein. The lower bushing 127' of the illustrated embodiment comprises a hard, low-friction plastic, such as UHMW plastic. The lower bushing 127' is sized to provide sliding, but laterally snug, engagement with the inner diameter of the outer tube 110'.

The lower end of the damper shaft 204 includes a reduced portion 216 which is inserted into a dropout aperture 218 in the dropout 50'. A dropout nut 220 threads into the reduced portion 216 of the damper shaft 204 to secure the damper shaft 204 to the dropout 50'. A damper shaft flange 222 is threadedly secured to the upper end of the damper shaft 204 and is designed to support and engage the lower end of the compression elastomer assembly 150'. The damper shaft flange 222 includes a central aperture 224 for slidably receiving the elastomer rod 152'. The damper shaft 204 further includes two circumferential grooves 226 which facilitate securement of the damper piston 206 to the damper shaft 204, as described below.

In order to prevent damping fluid from leaking out of the damper cylinder 202 around the damper shaft 204, damper seal assemblies 230 are provided inside the damper cylinder 202 on each end thereof. Each damper seal assembly 230 includes a damper seal gland 232 which supports a damper shaft seal 234 around an internal circumference thereof and a damper cylinder seal 236 around an exterior circumference thereof. In the illustrated embodiment, the damper seal gland comprises Delrin, a trademark of Du Pont de Nemours & Co., and the damper shaft and damper cylinder seals 234, 236 comprise rubber O-rings.

Figure 11B:
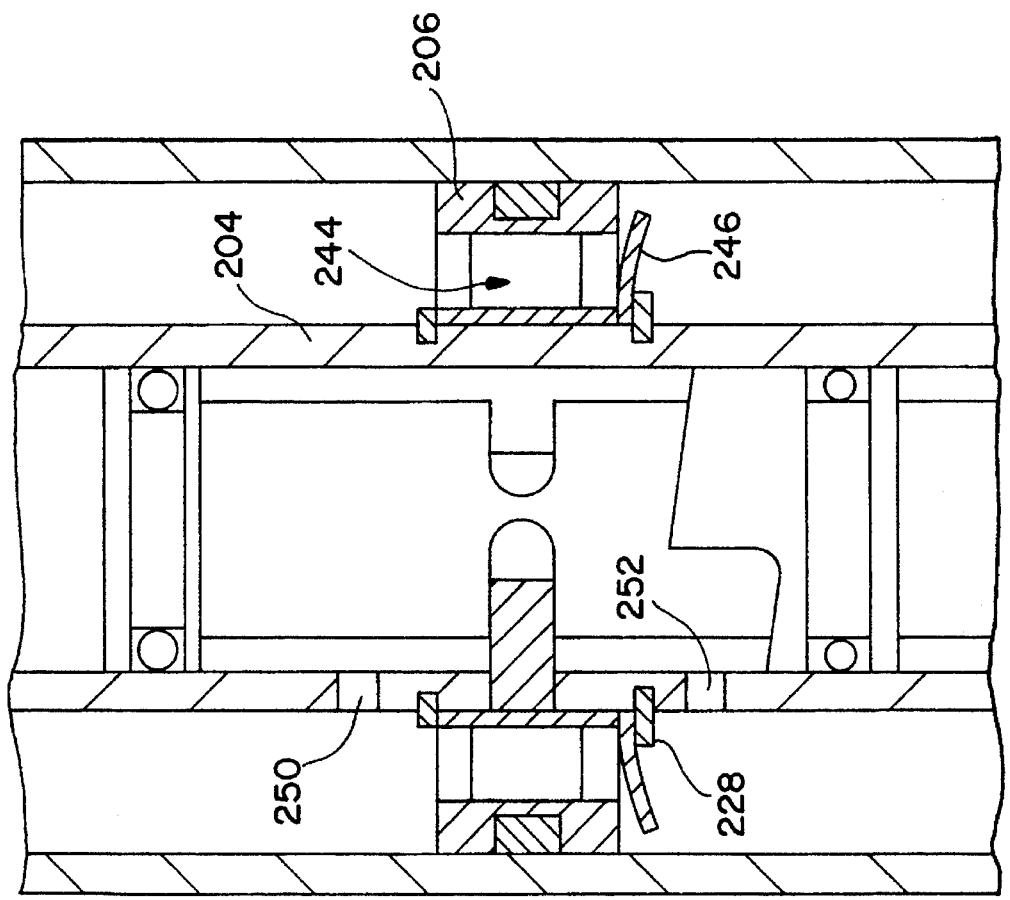
Figure 12:
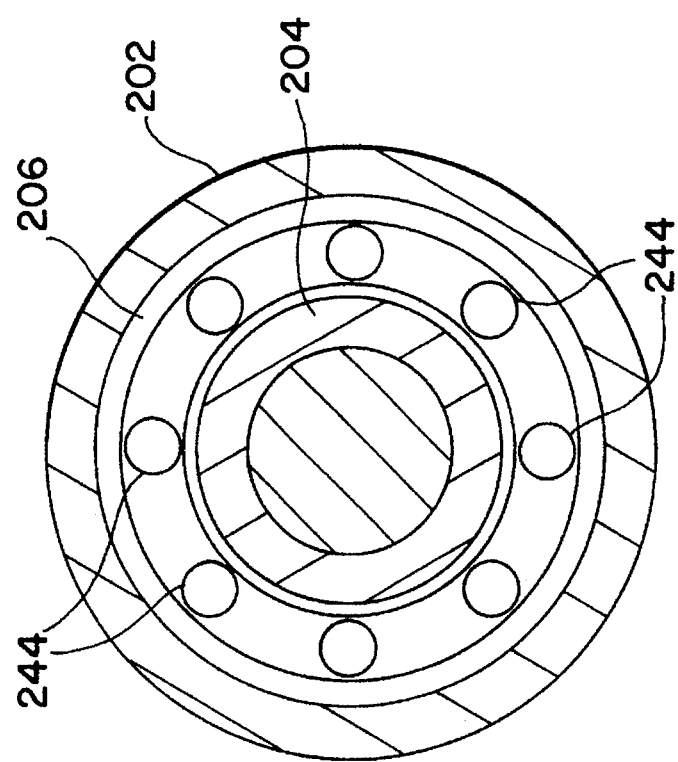
FIG. 12 is a section view, taken along line 12—12 in FIG. 10, showing an end view of the damper piston.

Referring to FIGS. 11a and 12, the damper piston 206 is a disc-shaped member which is secured to the damper shaft 204 via snap rings 228 positioned within the circumferential grooves 226 of the damper shaft 204 on opposing ends of the damper piston 206. The damper piston 206 includes a circumferential seal groove 240 for receiving a piston seal 242 therein. The piston seal 242 is a rubber O-ring and is designed to substantially prevent fluid from flowing between the damper piston 206 and the damper cylinder 202. The damper piston 206 further includes a plurality of axially-extending, circumferentially-spaced ports 244 extending therethrough, as best shown in FIG. 12. A flexible washer 246 is positioned between the snap ring 228 and the damper piston 206 on a lower end thereof. In the present embodiment, the flexible washer 246 comprises Delrin. The flexible washer 246 covers all of the ports 244 and is designed to allow for the flow of fluid from the upper end of the damper piston 206 to the lower end thereof by flexing away from the damper piston 206, as illustrated in FIG. 11*b*, while substantially preventing the flow of fluid through the ports 244 from the lower end of the damper piston 206 to the upper end thereof, as illustrated in FIG. 11*a*.

Due to the relatively large diameter and large number of ports 244 extending through the damper piston 206, there is minimal damping effect when fluid flows from the upper end of the damper piston 206 to the lower end thereof (i.e., when the inner and outer tubes are compressed toward each other). On the other hand, due to the presence of the flexible washer 246 on the lower end of the damper piston 206, fluid is essentially prevented from flowing from the lower end of the damper piston 206 to the upper end thereof (i.e., when the inner and outer tubes are extended away from each other), thereby requiring fluid to travel through a two-way adjustable valve during extension of the fork, as described below.

Referring to FIG. 13*a*, the two-way adjustable valve generally comprises upper and lower ports 250, 252 in the side wall of the damper shaft 204 on opposing sides of the damper piston 206. In FIGS. 13*a*–*b*, since the damper shaft 204 is shown in section, the ports 250, 252 are shown in phantom and represent the location of the ports as they are positioned on the near side of the damper shaft 204. Because the damper shaft 204 is hollow, fluid may flow into the upper port 250, through the interior of the damper shaft 204, and out the lower port 252, and visa versa, thereby defining a pathway through which fluid may flow from one end of the damper piston 206 to the other in either direction.

To provide for adjustment of the flow of fluid through the two-way valve, means are provided for selectively adjusting the effective cross sectional area of the lower port 252. Such means include a damper adjuster rod 254 positioned within the interior of the damper shaft 204 and extending from the lower end thereof to a mid portion thereof, as shown in FIG. 10. The adjuster rod 254 is dimensioned to be snug but rotatable within the damper shaft 204 and includes three adjuster rod seals 255 positioned around the circumference thereof, as fully illustrated in FIG. 10. Referring to FIGS. 13*a*–*b*, the adjuster rod 254 includes a reduced portion 256 of reduced diameter extending from just above the upper port 250 to just below the lower port 252, thereby defining a pathway through which fluid may flow from the upper port 250 to the lower port 252. Immediately below the lower port 252, the adjuster rod 254 includes a valve portion 258 having a diameter approximately equal to the internal diameter of the damper shaft 204. The upper surface 260 of the valve portion 258 is helical in shape (i.e., angled to approximately follow a left hand helix having a 0.125 lead). In other words, the longitudinal extent of the valve portion 258 varies by about 0.125 inch from the minimum length portion 262 to the maximum length portion 264, as illustrated in FIGS. 11 and 13.

By virtue of the varying longitudinal extent of the valve portion 258, the effective cross sectional area of the lower port 252 can be selectively adjusted to adjust the rate at which fluid will flow therethrough, and thereby adjust the damping of the fork. More specifically, the adjuster rod 254 may be positioned such that the minimum length portion 262 is aligned with the lower port 252, as illustrated in FIG. 13*a*. In this position, the lower port 252 is completely open and the fork will perform with minimal damping. As the adjuster rod 254 is rotated, the upper surface 260 of the valve portion 258 gradually covers a portion of the lower port 252, as illustrated in FIG. 13*b*. Such coverage of the lower port 252 restricts fluid flow therethrough, resulting in increased expansion damping of the fork.

The adjuster rod 254 includes an adjuster groove 266 extending partially around the circumference thereof. Referring to FIG. 11*a*, a pin 268 is positioned within a middle aperture 270 in the damper shaft 204 and extends into the adjuster groove 266 in the adjuster rod 254. The pin 268 maintains the adjuster rod 254 in alignment with the damper shaft 204 and further limits rotation of the adjuster rod 254 relative to the damper shaft 204.

Figure 14:
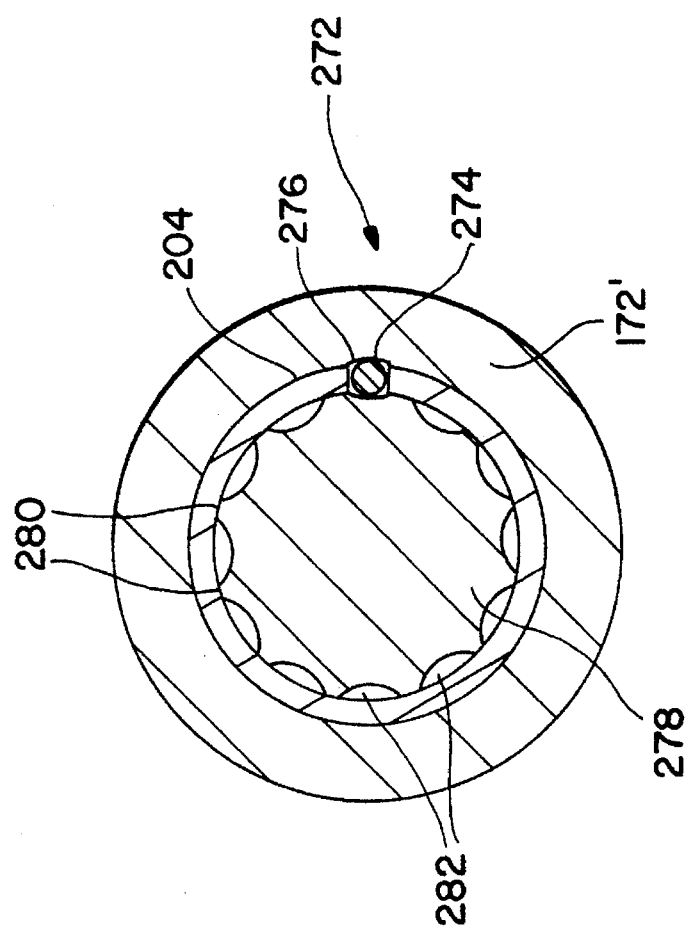
FIG. 14 is a cross-sectional view, taken along line 14—14 in FIG. 10, illustrating the ratchet assembly of the damped fork.

In order to prevent the adjuster rod 254 from inadvertently rotating, the damper mechanism is provided with a ratchet assembly 272, as illustrated in FIGS. 10 and 14. The ratchet assembly 272 includes a ball member 274 movably positioned within an orifice 276 in the side wall of the damper shaft 204 and engaged with a splined portion 278 of the adjuster rod 254. The ball is biased toward the splined portion 278 by the positive stop elastomer 172'. The splined portion 278 of the illustrated embodiment comprises twelve raised splines 280 defining twelve ratchet grooves 282 (i.e., each spaced about 30° from each other). In operation, when the adjuster rod 254 is rotated, the ball member 274 skips between the ratchet grooves 282 in the splined portion 278 of the adjuster rod 254, thereby providing a ratcheting sensation. When the adjuster rod 254 has been rotated to the desired position, the ball comes to rest within a ratchet groove 282 to decrease the likelihood that the adjuster rod 254 will inadvertently rotate.

Referring to FIG. 10, the lower end of the adjuster rod 254 is provided with a hexagonal socket 284 to allow insertion of an allen wrench and facilitate rotation of the adjuster rod 254. Accordingly, the adjuster rod 254 is accessible from the lower end of the fork legs 40' to allow for selective adjustment of expansive damping.

The bicycle forks described herein are particularly suited for bicycles which are ridden over uneven terrain, sometimes referred to as "off-road" or "mountain" bicycles. When encountering severely uneven terrain, the front wheel of a bicycle can be subjected to high torsional forces tending to twist/deflect the front wheel relative to the fork. It has been observed that a significant portion of wheel deflection occurs at the interface between the fork dropout and the wheel axle. Such deflection is undesirable in that it can result in fatigue failure of components and can adversely affect the handling and control characteristics of the bicycle.

Figure 17:
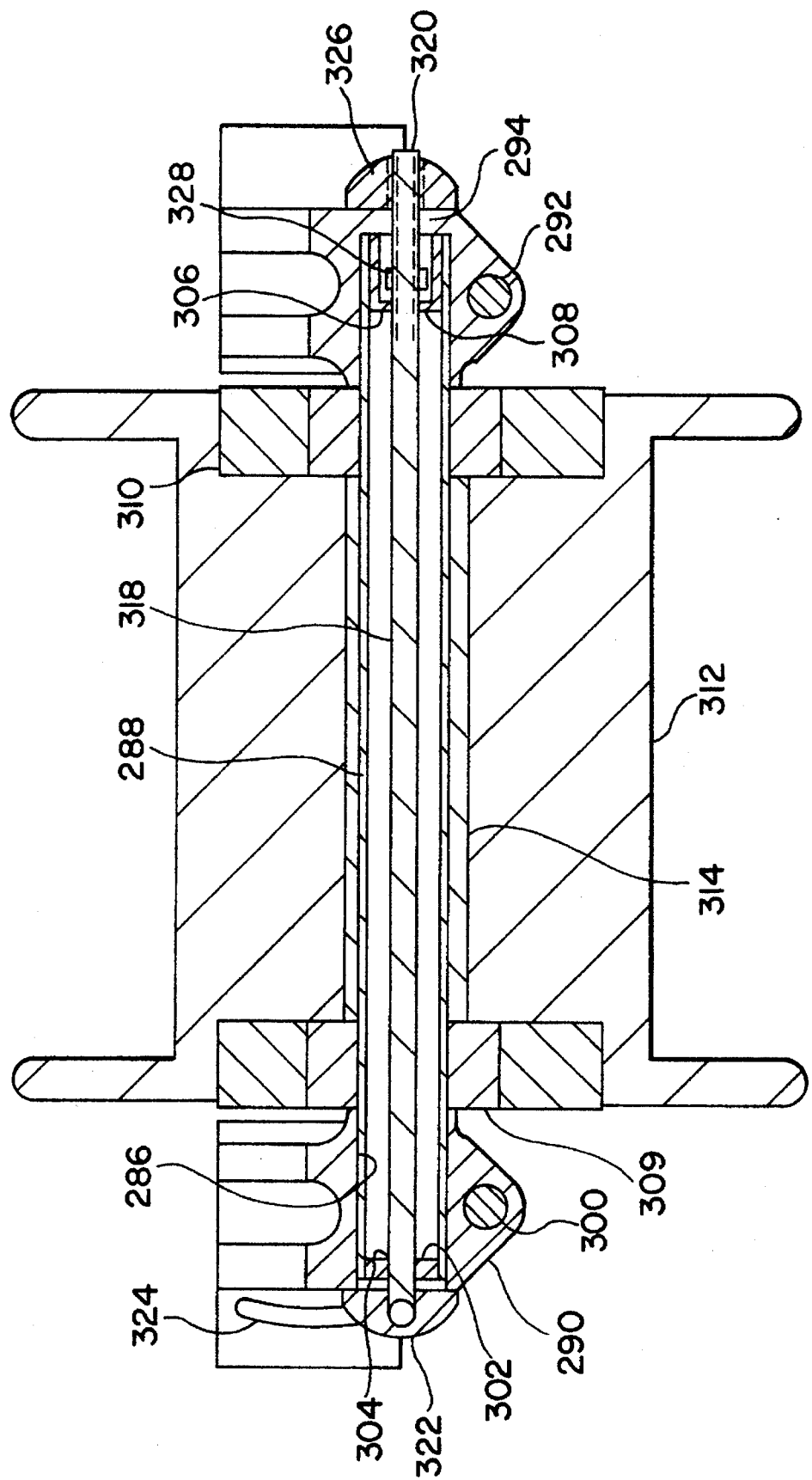
FIG. 17 is a cross-sectional view, taken along line 17—17 in FIG. 15, illustrating an alternative embodiment of a dropout and wheel axle assembly.

Accordingly, a novel fork dropout and wheel axle arrangement is provided and is illustrated in FIGS. 15–17. In this regard, FIGS. 15 and 16 are side and front views of the left dropout 292, respectively. Similar to the previous embodiment, each dropout 50' is an integral piece having a plug portion 52' and a wheel axle engaging portion 54'. The plug portion 52' is press fit to a respective one of the lower ends of the fork legs 40' and the axle engaging portion 54' is engageable with a respective end of a tubular wheel axle, as described herein.

The axle engaging portion 54' is cantilevered off the front side of the plug portion 52' and includes a laterally-extending cylindrical aperture 286 for receiving a tubular axle 288, as described below. As can be seen in FIG. 17, the aperture in the right dropout 290 extends completely through the axle engaging portion 54', while the aperture in the left dropout 292 extends only partially therethrough, ending at an abutment 294. The abutment 294 in the left dropout 292 has a centrally-located skewer hole 296 extending therethrough. Each dropout further includes a slot 298 extending from the lower surface of the axle engaging portion 54' and continuing through one side of the cylindrical aperture 286. The slot 298 facilitates clamping of the dropouts 290, 292 to the tubular axle 288 by tightening clamping bolts 300 threaded into the dropouts as illustrated in FIG. 15.

It should be noted that the width of the slot 298 is not as large as the diameter of the cylindrical apertures 286. As such, the axle must be inserted into the apertures from the side rather than up through the slot 298. The result is a dropout which wraps around the axle by greater than half the circumference (i.e., greater than 180°) as best shown in FIG. 15, which provides enhanced dropout-to-axle stiffness.

The wheel axle assembly of the illustrated embodiment comprises an elongated tubular axle 288 having a diameter of about 0.5 inch. The axle is fabricated from cromoly steel and has a wall thickness of about 0.035 inch. The right end of the axle includes a disk-shaped end cap 302 having a skewer-centering hole 304 therein. The left end of the axle has a cup-shaped end cap 306 with a skewer-centering hole 308 therein. The end caps 302, 306 may be secured to the axle by any appropriate means, such as by brazing. The axle is slidably positioned within the inner races 309 of two wheel bearings, the outer races 310 of which are press fit in opposing end portions of a wheel hub 312. The bearings of the illustrated embodiment are 0.5 inch ID and 1.125 inch OD sealed cartridge bearings. The inner races of the cartridge bearings are interconnected by a spacer tube 314 to reduce lateral loads on the bearings. The wheel hub 312 supports a wheel rim (not shown) by appropriate means (e.g., spokes), as is known in the art.

The axle assembly further comprises a skewer mechanism for axially securing the dropouts to the bearing/hub assembly. The skewer mechanism includes a longitudinally-extending rod 318 threaded on one end 320 and provided with a lever-actuated cam mechanism 322 on the other end, as is generally known in the art. The rod 318 of the skewer mechanism is positioned through the skewer-centering holes 304, 308 in the end caps 302, 306 with the lever-actuated cam mechanism 322 adjacent the right dropout 290 and the threaded end 320 extending through the left dropout 292. A skewer nut 326 is threaded onto the threaded end 320 of the rod, thereby allowing the lever 324 of the cam mechanism 322 to be rotated to clamp the dropouts 50' to the bearings. The skewer mechanism further includes an inner nut 328 threaded onto the threaded end 320 of the skewer and positioned within the cup-shaped end cap 306 of the wheel axle. Such inner nut 328 facilitates removal of the wheel axle, as described below.

The utilization/assembly of the fork dropout and wheel axle arrangement will now be described. The wheel hub 312 and wheel bearing assembly (i.e., with the outer races 310 of the wheel bearings press fit into the wheel hub 312) is positioned between the dropouts 290, 292 with the inner races 309 aligned with the cylindrical apertures 286 in the dropouts. With the skewer rod 318 positioned in the wheel axle 288 and the inner nut 328 in place, the axle is inserted through the aperture 286 in the right dropout 290, through both bearings, and through the left dropout 292 until the end of the wheel axle 288 engages the abutment 294 of the left dropout 292. The skewer nut 326 is then threaded onto the threaded end 320 of the skewer rod until it approximately contacts the left dropout 292. The actuating lever 324 can then be rotated to clamp the dropouts 290, 292 to the inner races of the bearings. Next, the clamping bolts 300 are tightened to clamp the dropouts 290, 292 securely to the axle 288.

To remove the wheel (i.e., the hub) from the fork (i.e., the dropouts), the reverse operation is performed. That is, the clamping bolts 300 are unscrewed to loosen the interface between the dropouts 290, 292 and the axle 288. The actuating lever 324 of the skewer mechanism is then rotated to unclamp the dropouts 290, 292 from the inner races 309 of the bearings. Next, the skewer nut 326 is unthreaded from the skewer rod 318. The wheel axle 288 may subsequently be removed from the dropouts through the right dropout 290. Such removal of the axle 288 is facilitated by positioning of the inner nut 328 on the skewer rod 318, thereby allowing removal of the axle 288 by merely pulling on the actuating lever 324 of the skewer mechanism.

By virtue of the above-described dropout and wheel axle arrangement, the interface between the dropouts and the wheel axle is significantly strengthened and stiffened, thereby improving the overall performance of the bicycle. It is believed that such improved strength and stiffness is a result of the larger diameter tubular wheel axle and/or the increased (i.e., greater than 180°) wrap-around of the dropouts 50' around the circumference of the axle.

It should be noted that, for the arrangement illustrated in FIG. 17, it is not always necessary to clamp the dropouts to the axle. More specifically, it has been observed that the dropouts 290, 292 do not necessarily need slots 298 and clamping bolts 300, in which case the dropouts 50' would not be rigidly clamped to the axle. With tight tolerances between the apertures and the axle (i.e., on the order of less than about 0.0005 inch clearance), it has been found that the clamping action of the skewer rod 318 is sufficient to provide adequate securement of the dropouts 290, 292 to the bearing and wheel hub assembly. With such an arrangement, the dropouts would wrap around the entire circumference of the axle, thereby potentially providing even greater stiffness to the dropout 50' and axle interface.

Figure 18:
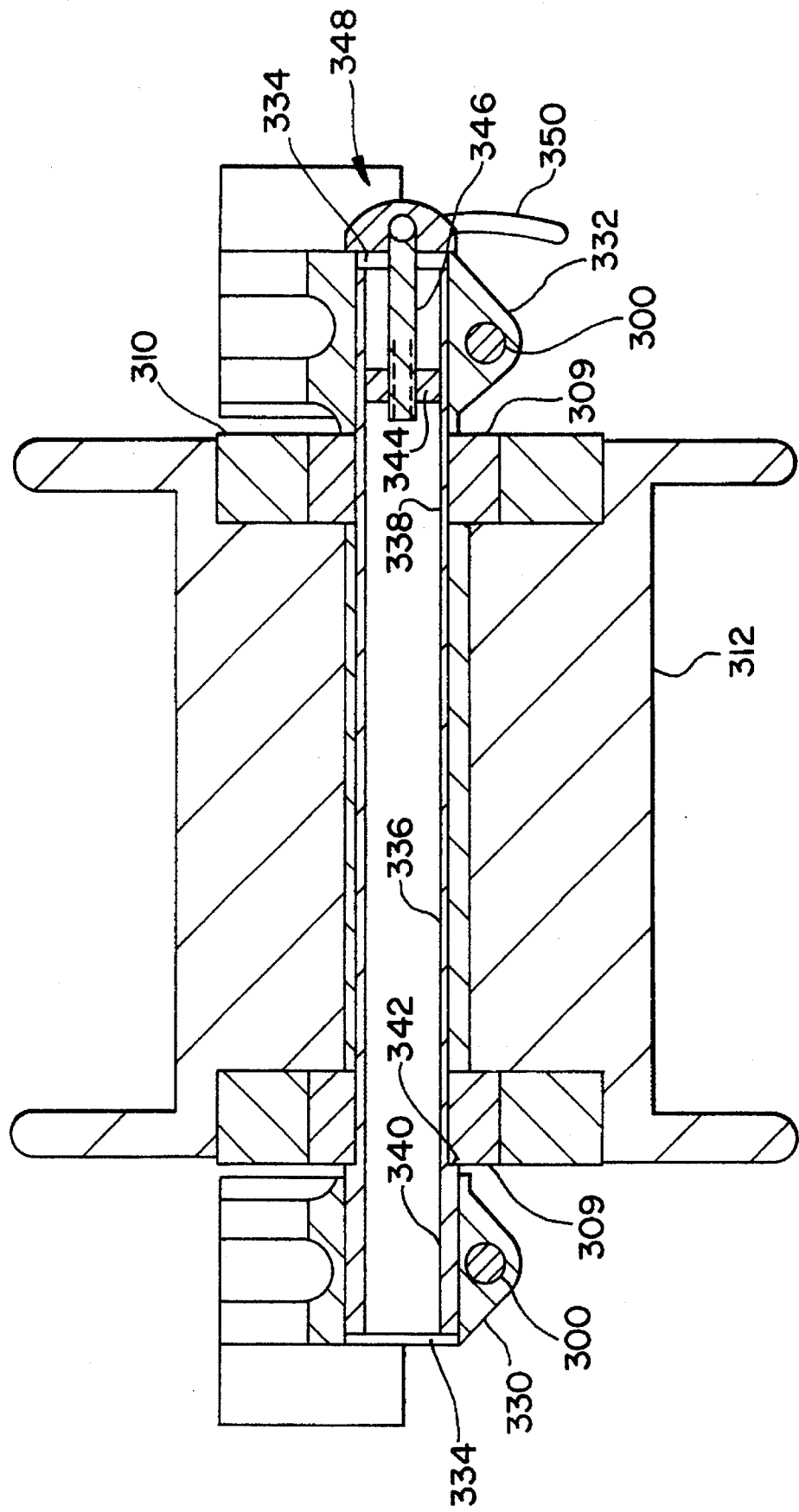
FIG. 18 is a cross-sectional view, similar to FIG. 17, illustrating another alternative embodiment of a dropout and wheel axle assembly.

An alternative dropout and wheel axle arrangement is illustrated in FIG. 18. The dropouts 330, 332 of the alternative arrangement are essentially identical to the dropout illustrated in FIGS. 15 and 16, except that the cylindrical aperture 334 extends completely through both dropouts, without the provision of an abutment 294, and the cylindrical aperture 334 of the right dropout 330 is larger in diameter than the cylindrical aperture 334 of the left dropout 332, as will be described below in more detail. The wheel bearings 310, wheel hub 312, and spacer tube 314 illustrated in FIG. 18 are essentially identical to that illustrated in FIG. 17.

The wheel axle 336 of the alternative arrangement is a longitudinally-extending tubular member having a first portion 338 with a diameter of about 0.5 inches and a second portion 340 positioned on the left end of the wheel axle thereby forming a shoulder 342 on the wheel axle. Inside the wheel axle, there is positioned a threaded insert 344 on the left end thereof. The threaded insert is designed to threadedly receive the threaded rod 346 of a skewer mechanism 348. The threaded rod 346 is interconnected with a lever-actuated cam mechanism, as is generally known in the art.

During assembly, the wheel bearing 310 and wheel hub 312 assembly is positioned between the dropouts with the inner race 309 of the bearing aligned with the cylindrical apertures 334 in the dropouts 330, 332. The first portion 338 of the axle is then inserted through the right dropout 330, through the inner races 309 of the wheel bearings, and into the left dropout 332 until the shoulder 342 of the axle abuts the inner race 309 of the right wheel bearing. The threaded rod 346 of the skewer mechanism 348 is then threaded into the axle insert 344 until the left dropout 332 is generally flush with the inner race 309 of the left wheel bearing. The lever 350 of the skewer mechanism 348 is subsequently rotated to clamp the inner races 309 and spacer tube 314 between the axle shoulder 342 (i.e., on the right side) and the left dropout 332 (i.e., on the left side).

It should be appreciated that the right dropout 330 plays no role in clamping the axle 336 to the bearings, but rather can float laterally relative to the axle 336 so that substantially no lateral stresses are induced into the fork legs 46, 48. Such lateral loads are undesirable in that they can result in premature wear and/or binding of the upper and lower fork legs 46, 48. After clamping of the wheel bearings between the axle 336 and the left dropout 332, the clamping bolts 300 are tightened to clamp the dropouts 330, 332 securely to the axle 336.

To remove the wheel hub 312 from the dropouts, the reverse operation is performed. That is, the clamping bolts 300 are unscrewed to loosen the interface between the dropouts and the axle 336. The actuating lever 350 of the skewer mechanism 348 is then rotated to unclamp the axle shoulder 342 and the left dropout 332 from the inner races 309 of the wheel bearings. Next, the skewer mechanism 348 is unthreaded from the threaded insert 344 and removed from engagement therewith. The wheel axle 336 may subsequently be removed from the wheel bearings through the right dropout 330.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A bicycle fork for interconnecting a bicycle wheel to a bicycle frame, said bicycle fork comprising:

at least one leg assembly comprising first and second leg members slidably engaged with each other, said at least one leg assembly being compressible by relative movement of said first and second leg members toward each other, and being expandable by relative movement of said first and second leg members away from each other;

biasing means for providing a biasing force when said leg assembly compresses, said biasing means including at least one elastomer; and at least one positioning member positioned adjacent to said at least one elastomer and including a raised portion extending toward said at least one elastomer on the perimeter thereof for facilitating maintenance of said at least one elastomer in alignment with said leg members.

2. A bicycle fork, as recited in claim 1, wherein said raised portion comprises an upstanding annular ridge extending substantially around the circumference of at least part of said at least one elastomer.

3. A bicycle fork, as recited in claim 1, wherein said at least one elastomer comprises at least two elastomers, and wherein said at least one positioning member is positioned between said at least two elastomers.

4. A bicycle fork, as recited in claim 3, wherein said raised portion comprises an upstanding annular ridge, a first part of said ridge extending toward one of said at least two elastomers and a second part of said ridge extending toward another of said at least two elastomers.

5. A bicycle fork, as recited in claim 3, wherein said at least two elastomers comprises a plurality of pairs of adjacent elastomers, and wherein said at least one positioning member comprises a positioning member positioned between each of said pairs of adjacent elastomers.

6. A bicycle fork, as recited in claim 1, wherein said at least one positioning member and said at least one elastomer each include a bore extending therethrough, and wherein said bicycle fork further comprises an elastomer rod positioned through said bores in said at least one positioning member and said at least one elastomer.

7. A bicycle fork, as recited in claim 6, wherein said bores are substantially centrally located on said at least one positioning member and said at least one elastomer.

8. A bicycle fork, as recited in claim 1, further comprising a compression rod having a first end interconnected with one of said leg members and a second end engaged with said at least one elastomer.

9. A bicycle fork, as recited in claim 8, further comprising a compression flange positioned on said second end of said compression rod in engagement with said at least one elastomer.

10. A bicycle fork, as recited in claim 9, wherein said compression flange includes a protruding portion extending toward said elastomer on the perimeter thereof for facilitating maintenance of said elastomer in alignment with said first and second leg members.

11. A bicycle fork, as recited in claim 10, wherein said protruding portion comprises an upstanding annular protrusion extending substantially around the circumference of said at least one elastomer.

12. A bicycle fork for interconnecting a bicycle wheel to a bicycle frame, said bicycle fork comprising:

at least one leg assembly comprising first and second leg members slidably engaged with each other, said at least one leg assembly being compressible by relative movement of said first and second leg members toward each other, and being expandable by relative movement of said first and second leg members away from each other, at least one of said first and second leg members having a tapered wall thickness, wherein the first tube slides within the second tube, and wherein the first tube has the tapered wall thickness; and biasing means for providing a biasing force when said leg assembly compresses.

13. A bicycle fork, as recited in claim 12, wherein the first tube has a wall thickness which is greater at a top portion than at a bottom portion.

14. A bicycle fork for interconnecting a bicycle wheel to a bicycle frame, said bicycle fork comprising:

at least one leg assembly comprising first and second leg members slidably engaged with each other, said at least one leg assembly being compressible by relative movement of said first and second leg members toward each other, and being expandable by relative movement of said first and second leg members away from each other;

biasing means for providing a biasing force when said leg assembly compresses, said biasing means comprising an elastomer and being contained within said first leg member; and first means for aligning said biasing means within said first member; and second means, separate from said first means, for aligning said biasing means within said first leg member, wherein said first means comprises an elastomer rod which extends through said elastomer and said second means comprises a generally cup-shaped member which receives an end portion of said elastomer.

15. A bicycle fork, as recited in claim 14, wherein said first means engages an internal portion of said elastomer and said second means engages an external portion of said elastomer.

16. A bicycle fork, as recited in claim 14, wherein said biasing means further comprises a plurality of said elastomers and at least one of said second means is positioned between each adjacent pair of said elastomers.

17. A bicycle fork, as recited in claim 16, wherein each said second means comprises two generally cup-shaped portions extending in opposite directions, each of said cup-shaped portion receiving at least part of one of said adjacent pair of said elastomers.

18. A bicycle fork for interconnecting a bicycle wheel to a bicycle frame, said bicycle fork comprising:

at least one leg assembly comprising first and second leg members slidably engaged with each other, said at least one leg assembly being compressible by relative movement of said first and second leg members toward each other, and being expandable by relative movement of said first and second leg members away from each other;

biasing means for providing a biasing force when said leg assembly compresses, said biasing means comprising a plurality of elastomers contained within said first leg member; and first means for aligning said biasing means within said first member; and second means, separate from said first means, for aligning said biasing means within said first leg member, wherein at least one of said second means is positioned between each adjacent pair of said elastomers and wherein each said second means comprises two generally cup-shaped portions extending in opposite directions, each of said cup-shaped portions receiving at least part of one of said adjacent pair of said elastomers.

\* \* \* \* \*

UNITED STATES PATENT AND TRADEMARK OFFICE
CERTIFICATE OF CORRECTION

PATENT NO. : 5,597,169
DATED : January 28, 1997
INVENTOR(S) : E. Douglas Bradbury It is certified that error appears in the above-indentified patent and that said Letters Patent is hereby corrected as shown below:

On the title page, item [73] should read as follows:

ASSIGNEE: Manitou Mountain Bikes, Inc.

Signed and Sealed this

Thirteenth Day of May, 1997

*Attest:*

BRUCE LEHMAN

*Attesting Officer*     *Commissioner of Patents and Trademarks*